United States Patent
Müller-Marc et al.

(10) Patent No.: US 7,804,634 B2
(45) Date of Patent: Sep. 28, 2010

(54) FLUIDIC MULTI COLOR DISPLAY

(75) Inventors: Oliver Müller-Marc, Appenzell (CH); Dieter Jerosch, Bad Soden (DE)

(73) Assignee: Advanced Display Technology AG, Appenzell (CH)

( * ) Notice: Subject to any disclaimer, the term of this patent is extended or adjusted under 35 U.S.C. 154(b) by 16 days.

(21) Appl. No.: 12/427,029

(22) Filed: Apr. 21, 2009

(65) Prior Publication Data

US 2009/0316252 A1    Dec. 24, 2009

(30) Foreign Application Priority Data

Apr. 22, 2008  (DE) .................. 10 2008 020 130

(51) Int. Cl.
*G02B 26/02* (2006.01)

(52) U.S. Cl. ...................................... 359/228

(58) Field of Classification Search ............... 359/228, 359/290, 296, 245, 248; 345/30, 55, 49, 345/48, 60, 84, 86, 105, 108, 107, 173, 179
See application file for complete search history.

(56) References Cited

U.S. PATENT DOCUMENTS

| | | | |
|---|---|---|---|
| 6,120,588 A | 9/2000 | Jacobson | |
| 6,924,792 B1 | 8/2005 | Jessop | |
| 7,034,987 B2 * | 4/2006 | Schlangen | 359/296 |
| 7,075,502 B1 | 7/2006 | Drzaic | |
| 7,304,786 B2 | 12/2007 | Hagood | |
| 7,382,521 B2 * | 6/2008 | Chopra et al. | 359/296 |

* cited by examiner

*Primary Examiner*—Scott J Sugarman
*Assistant Examiner*—Tuyen Q Tra
(74) *Attorney, Agent, or Firm*—Marshall & Melhorn, LLC

(57) ABSTRACT

The apparatus claimed by the invention uses as the display medium colors in the form of colored fluids which are transported by means of transport in a system of compartments within a fluidic chain, whereby they are visible from the direction of an observer only through a single one these compartments (image compartment). Depending on the position of the individual colored fluids, a different color impression is received by the observer. The invention thereby teaches the presence of a fluidic chain in a subpixel and the combination of a plurality of these subpixels in a pixel. The display claimed by the invention consists of a plurality of pixels. With the use of eight colors in connection with an optically created color mixing effect, a color space can be displayed which is sufficient at least for the display of the information typically used on advertising signs.

22 Claims, 12 Drawing Sheets

Fig. 13

| Anzahl der Subpixel (Stapel) pro Pixel | Anzahl der Farben | Äquivalent Bits |
|---|---|---|
| 1 | 8 | 3 |
| 2 x 2 | 330 | ≈ 8 |
| 3 x 3 | 11,440 | ≈ 13 |
| 4 x 4 | 245,157 | ≈ 18 |
| 5 x 5 | 3,365,856 | ≈ 22 |
| 6 x 6 | 32,224,114 | ≈ 25 |

FLUIDIC MULTI COLOR DISPLAY

FIELD OF THE INVENTION

This invention relates in general to the field of display instruments, and in this case in particular to the field of displays that display images or information which in the standard case consists of a plurality of individual pixels which, when viewed at a sufficient distance from the display, optically merge into a single overall image. In particular the invention relates to such displays in which the display is based on the use of colored fluids.

In concrete terms, the invention relates to an apparatus called a subpixel below for the simultaneous display of exactly one single point selected from a number of discrete colors and with a specified color, and to an apparatus called a pixel below for the simultaneous display of a plurality of points, each of which is of a specified color, with the use of a plurality of subpixels claimed by the invention, whereby a variable color impression is produced by the simultaneous display of these points. The invention further relates to an apparatus called a display below for the display of information in color using a plurality of pixels claimed by the invention. Finally, the invention relates to a method for the display of information in color using the apparatus claimed by the invention.

PRIOR ART AND DISADVANTAGES

Display instruments for the presentation of information have been established technology for a number of years. In the simplest case, for example, displays of this type can be light bulbs, with which only a binary yes-no information can be displayed. More complex information can be displayed, for example, by a plurality of appropriate binary display instruments such as dot matrix displays. Displays of this type generally consist of regular patterns of small, essentially punctiform individual displays, whereby the term "point" is not restricted exclusively to round individual displays but also comprises any other desired shapes.

The individual displays can thereby be of a mechanical nature, for example; in addition to split-flap, which are used, for example, in generally large-format display panels and similar applications, and spheres, one half of which is black and the other half of which is white, can create a black or white image impression depending on the orientation of the spheres with respect to an observer. One advantage of mechanical displays of this type is above all the fact that they need essentially no additional supply of energy for the display of static information. The display requires energy only when the image being displayed changes. One disadvantage of displays of this type, however, is that switching between the two states is frequently a slow process, as a result of which these displays are not used, or are used only to a very limited extent, for the display of dynamic information such as, for example, moving images or scrolling text. A further disadvantage lies in the fact that the number of colors that can be represented by such displays is very limited, because when mechanical means are used, and in particular when spheres are used, only a few colors can be carried on their surface. Accordingly, the mixing of colors is possible only to a limited extent, as a result of which the color palette that can be displayed is correspondingly small.

The prior art further describes matrix displays in which the information to be displayed is generated by means of small, generally punctiform light sources. Light sources of this type can be, for example, light-emitting diodes (LEDs), liquid crystal displays (LCDs) or thin film transistor (TFT) displays. These displays are generally capable of presenting a very large number of colors and a wide range of levels of brightness. The individual pixels of these displays can also be so small that they are not visible to the human eye, even when viewed from a very short distance. On the other hand, the prior art also describes pixels which are so large that the observer must be several tens of meters away to perceive the information that is being displayed by the individual pixels as at all coherent. One disadvantage of such displays, which can also be designated active matrix displays, is primarily their high energy consumption, because these displays consume energy constantly during their entire period of operation. This high energy consumption is frequently unacceptable, in particular in the case of mobile applications or particularly large-format display surfaces such as advertising signs, for example, the content of which changes only infrequently in any case. A further disadvantage of active matrix displays of a certain construction lies in the generally narrow temperature range in which they can be operated. LCD displays which consume particularly low levels of power use liquid crystals which can become extremely sluggish, especially at temperatures below the freezing point, and can result in frozen displays. LED displays are not subject to this temperature problem and can therefore basically be used over a wide range of temperatures, although they simultaneously also consume the most power.

Different technologies are also used to produce colors in similar devices of the prior art. These technologies differ from one another essentially in that they either produce the desired color completely inside a pixel, and the color is radiated by the pixel, or the desired color is achieved by the mixing of a plurality of individual colors of lower-level pixels (subpixels) which are easier to display. When the observer is a sufficient distance away, the individual colors of the subpixels merge into the desired color impression. Although this last variant has the disadvantage that the corresponding subpixels, taken together, form a correspondingly larger pixel and thus the image to be displayed must therefore be viewed from a greater distance or will have a correspondingly lower-resolution effect, this principle is applied wherever the focus is less on extremely natural colors and displays that are especially small, as well as in applications where the advantage of lower manufacturing costs is more important, in particular in the case of particularly large-format displays.

One disadvantage that is common to almost all of the displays known from the prior art lies in the problem of defective individual pixels. Accordingly, defects in a certain small number of pixels in TFT displays can even be tolerated, because the manufacture of completely defect-free displays is possible only at high cost or a high rate of rejects. The subsequent repair of defective pixels is either impossible under normal conditions or is possible only with a very high level of technological effort; this statement applies to the same extent to LCD displays. It is at least theoretically possible to even replace these individual pixels only on matrix displays that use light-emitting diodes and which are equipped with relatively large individual pixels for the display of large-format information.

A further disadvantage of the majority of the technologies described above is the rigidity of the displays or of the substrates on which they are constructed. Under normal conditions, therefore, it is not possible to bend displays without causing irreversible damage to the display. It can be advantageous, however, to provide a certain degree of flexibility, for example to be able to install displays on curved substrates such as motor vehicle dashboards or advertising columns or pillars.

One proposed solution to the problem of excessive energy consumption is presented, for example, in U.S. Pat. No. 7,304,786 filed by Liquavista (NL). The display principle described in this document is based on the use of colored fluids, or more specifically a two-phase mixture of a colored fluid (water) with a carrier fluid (oil). The individual pixel is switched by means of the electrowetting effect. By utilizing the electrowetting effect, the energy consumption can be drastically reduced, in particular during the display of static information, because energy is consumed only to change a color but not to preserve a color. On one hand, however, displays of this type are suitable for operation only at normal ambient temperatures, and on the other hand the technology described in the cited prior art document works only up to a certain pixel size, as a result of which large-format displays in particular cannot be realized using a technology of this type. The pixels also comprise only one single color, so that the display of a plurality of different colors can be achieved only by means of a closely-packed arrangement of sub-pixels of different colors and the use of the optical merging of these subpixels into one pixel.

Likewise, a very low energy consumption is achieved by the products of E-Ink Corporation (USA), the operating principle of which is described, for example, in U.S. Pat. No. 6,120,588 ("Electronically addressable microencapsulated ink and display thereof"). Accordingly, the technology is based on small microcapsules, which can be colored black and white, for example, and are contained in closed, round compartments, for example. The different colored microcapsules are thereby charged either positively or negatively. As a result of the installation and subsequent actuation of electrodes, the appropriately colored microcapsules are oriented in a plane that lies parallel to an observer along the field lines of an electrical field, so that a black or white color impression results (electrophoresis effect). Because the movement of the microcapsules is effected by means of electrical fields, only very little energy is required for the purpose. Displays of this type are theoretically usable over a relatively broad range of temperatures, provided that the corresponding materials are designed for this temperature range. One particular distinguishing characteristic of displays of this type is their high mechanical flexibility, because the above mentioned compartments can be installed together with the electrodes preferably in or on thin, flexible and at least partly transparent films. However, this display method is theoretically limited to the display of two colors, such as black or white, because a separate polarity must be assigned to each color, and naturally there are only two polarities available, namely plus and minus. By means of a combination of a plurality of subpixels, each of which comprises different colors, described in U.S. Pat. No. 7,075,502 ("Full color reflective display with multichromatic sub-pixels"), it is of course possible to achieve an expanded color impression, but such a color impression results in a correspondingly less detailed image or requires the observer to be farther away, analogous to the variants described above.

U.S. Pat. No. 6,924,792 B1 ("Electrowetting and electrostatic screen display systems, color displays and transmission means"), and in particular its FIGS. 6, 7 and 8, describes an apparatus for the display of color information using at least one pixel with a variable color, in which the at least one pixel consists of at least one subpixel which comprises a fluid chain in the form of a plurality of compartments for the separate storage of certain specified colors that are present in fluid form. The choice of colors is thereby made in accordance with the intended subsequent application. The scope of potential applications thereby extends from the decoration of enclosures for mobile telephones through computers, automobile roofs and toys to military applications, as well as to the reproduction of images and text.

U.S. Pat. No. 6,924,762 B1 was referenced for the drafting of the introduction to Claim 1.

OBJECT OF THE INVENTION AND SOLUTION

Starting from the prior art described above, the object of the invention is to make available an apparatus for the display of color information in which a significantly improved representation of the color space is guaranteed.

The object of the invention is further the creation of an apparatus for the display of color information using individual pixels, whereby it must be possible to operate these pixels both at temperatures that are significantly below the freezing point as well as at temperatures that extend into the range of the boiling point of water and even higher. Moreover it must be possible to operate the apparatus with the least possible energy, whereby in particular the display of static information, where possible, requires essentially no energy or only very little energy for the display. The apparatus must also make possible an easy replacement of individual pixels, e.g. defective pixels, without having to replace a large number or even all of the pixels. The color space reproduced by the apparatus must be at least sufficient for the representation of color advertising signs or similar images. Finally, the apparatus claimed by the invention must offer the potential for the manufacture of at least somewhat flexible displays.

This object is accomplished by the apparatus described in Claim 1 and the method described in Claim 18.

Accordingly, the apparatus claimed by the invention uses, as the display medium, colors in the form of colored fluids which can be transported by a transport means in a system of compartments, whereby they are visible through only a single one of these compartments (image compartment) from the direction of an observer. Depending on the position of the individual colors, a different color impression is visible to the observer The basis of the invention is the knowledge that the color space is presented optimally when the basic colors red, green, blue, cyan, magenta, yellow, white and black are used. The colors in the compartments can then be selected so that the desired color space of the pixels can be reproduced optimally. For example, with a pixel consisting of 4×4 subpixels, 245,157 colors are possible. If, for example, a pixel is defined by 2×2 subpixels, although only 330 colors can be reproduced, a significantly better structural resolution is possible as a result of the smaller pixel size. The adaptation of the color and resolution can be accomplished by software.

The method claimed by the invention is for the advantageous utilization of the apparatus claimed by the invention and describes the mode of operation for the initialization and operation of the apparatus.

Additional preferred embodiments of the invention are described in the dependent claims and in the following detailed description, which makes reference to the accompanying figures.

DESCRIPTION

This invention relates to an apparatus for the display of color information, which can also be called a color display. The invention teaches that the apparatus uses at least one pixel, the color of which is variable. The apparatus claimed by the invention is thereby characterized by the features of the pixel described below.

The invention teaches that the at least one pixel consists of at least one subpixel. In one preferred embodiment, the at least one pixel consists of three subpixels. The pixel can comprise a plurality of subpixels which are functionally and/or constructively combined to form a higher-level unit. "Functionally" means that the subpixels are activated jointly, so that seen from the outside, only the pixel receives and interprets the signal. "Constructively" means that the subpixels are geometrically arranged so that they can be perceived as clearly coherent, for example on the basis of a corresponding enclosure, marking or similar characterization.

The sub-pixel comprises a "fluidic chain" in the form of a plurality of "compartments". These compartments are used for the separate storage (i.e. storage spatially segregated from one another) of certain specified colors that are present in fluid form. Each of the compartments thereby comprises a certain volume which is separated from the environment, e.g. by walls. It is particularly preferable if all the compartments in the fluidic chain have essentially the same volume. At least one of the compartments is filled with a color which, within the limits of the operating temperatures, is always in fluid form. The invention teaches that both carrier fluids that carry color particles as well as colored pigments dissolved in carrier fluid can be used. Preference is given to the use of colors or colored fluids that cover the widest possible temperature range, in particular a temperature range from approximately −20 to +50 degrees Celsius without the (carrier) fluid freezing or boiling. Preference is also given to the use of color or colored fluids in which the colored particles do not settle or settle only very slowly (e.g. longer than 1 year). For purposes of simplification, the term "colored fluids" is used in the following portion of the description. The invention teaches that these colored fluids can be transported in channels which fluidically connect the individual compartments with one another into a series (fluidic chain). The invention also teaches that the fluidic chain also comprises an image compartment. It is particularly preferred if this image compartment also has the same volume as the other compartments and is also used to contain a limited volume of color. It differs from the other compartments, however, in terms of its function, in that its contents are visible to an outside observer from the outside through an aperture (subpixel image aperture) which is provided for the purpose, while the invention teaches that the contents of the other compartments are kept concealed from this observer. The subpixel image aperture can thereby be shaped in a number of different ways. In one particularly preferred embodiment, it is made of a material that surrounds the subpixel or the housing that surrounds the subpixel and is not transparent to the human eye, while on the side of the housing which is located between the image compartment and the observer, a material is used which is completely transparent to the human eye, or at least is essentially transparent for the wavelength to be displayed. In an additional embodiment, the subpixel image aperture consists only of an opening in the surrounding housing. In this case, however, it is normally necessary to take other steps to ensure that the contents of the image compartment cannot come into contact with the environment.

Because the image compartment is a component of the at least one subpixel claimed by the invention, which for its part is a component of the at least one pixel claimed by the invention, care must be taken to ensure that the contents of the image compartment are visible not only through the subpixel, but analogously are also visible to an observer through the pixel. Therefore the apparatus claimed by the invention is further characterized in that the at least one pixel comprises a pixel image aperture, through which essentially only the individual subpixel image aperture or apertures are visible. If a separation from the external environment has already been achieved by means of a transparent wall or cover of the subpixel image aperture, the invention teaches that it is no longer necessary for the pixel image aperture to be made of any material at all; it is already sufficient to simply leave the housing that forms the pixel open at the appropriate point. In certain cases it can be necessary, however, for the pixel image aperture to be made of transparent material, namely in particular if the pixel image aperture consists of only one opening.

The invention further teaches that the apparatus comprises means for the transport of the colored fluids. These means for the transport of the colors are necessary to transport the colored fluids that are present in the individual compartments inside the fluidic chain. Because on one hand only those colored fluids that are in the image compartment are visible to an observer, but on the other hand the display is preferably used for the presentation of a plurality (at least two) of colors (black and white and transparent also count as colors, for example), it must be possible to transport or convey the desired colors into the image compartment and out of the compartment again. The invention teaches that the means for transport must be fluidically in series with the compartments and the image compartment of the subpixel, i.e. they must be a part of the fluidic chain. As required, they can act unidirectionally or bidirectionally, i.e. for transport in one or two directions. As required, there can be a plurality of means for transport within one subpixel; preferably, however, there is only one means for transport (and only one is necessary). Because it is in the fluidic chain, it acts in the direction of transport by means of a pressure increase (pumping), or alternatively or additionally in the other direction by reducing the pressure (by suction). Because there are no large, compressible or expandable gas volumes between the individual compartments, a pressure increase caused by the means for transport and applied at any desired point of the fluidic chain results in a transport of the individual volumes of colored fluids in this direction, whereby the individual colors change as the colored fluids are progressively separated from one another from one compartment to the next. On account of the pressure decrease on the other side of the transport means facing away from the direction of transport, the corresponding volumes are transported toward or through the means of transport.

Basically, potential means of transport include all devices and apparatus which are suitable for the transport or conveyance of in particular small quantities of fluid. Preference is given, however, to devices that come from the group comprising fluid pumps and electrowetting. Particular preference is thereby given to piezo membrane pumps and also to gas bubble pumps in which the pump movement is produced by means of a fluid volume that boils when exposed to strong heating and therefore expands, in connection with check valves. Particular preference is also given to other pump devices which work according to the electrowetting principle, according to it is possible to manipulate fluids, the surface energy of which is variable in an electrical field, so that by applying this electrical field to certain regions of the fluids present in the form of drops, the drops change their shape and can be moved in the direction of the electrical field.

In one preferred embodiment of the invention, and in the case where the at least one pixel consists of more than one subpixel, at least one of the subpixels comprises its own means for the transport of the colored fluids. It is particularly preferred if each of the subpixels comprises its own means for transport. With a correspondingly larger number of subpixels, the apparatus comprises a corresponding number of means for transport. The invention teaches, however, that not all the subpixels need to have their own means for transport.

In an additional preferred embodiment, at least one of the pixels comprises at least one means for the transport of the colored fluids and a means for the selection of the subpixel. In other words, the means for the transport of the colored fluids is, as claimed by the invention, not present in one or more of the subpixels, but is associated with the higher-level pixel which at least functionally combines them. In this manner it is possible to actuate a plurality of subpixels with a smaller number of means for transport. For this reason, the invention teaches that it is necessary to also provide means for the selection of the subpixel. By means of these means for selection it is possible to select those subpixels in which the colored fluids are to be transported. It can thereby also be possible to actuate a plurality of the subpixels of a pixel in parallel, i.e. simultaneously by the one means present in the pixel for the transport of the colored fluids. It is also possible for one pixel to comprise a plurality of means for transport, although fewer than the number of subpixels in the pixel. It is particularly preferred, however, for each pixel to comprise exactly one means for the transport of the colors and exactly one means for the selection of the subpixel.

In an additional preferred embodiment of the invention, the apparatus claimed by the invention comprises exactly one means for the transport of the colors and one means for the selection of the respective pixel and/or subpixel. In this embodiment, the invention teaches that the entire apparatus (display) comprises only one single means for the transport of the colors. Therefore it must also be possible, according to the invention, to actuate corresponding pixels or subpixels in which the colored fluids are to be transported separately or in groups. For this purpose, the invention provides a means for the selection of the respective pixel or subpixel. The invention therefore also teaches that it is advantageous to provide more than one means for the selection of the pixel, for example by combining a certain number of pixels into one block, which also comprises only one single means for the transport of the colored fluids and for the selection of the pixel or subpixel of the respective block. In one preferred embodiment of the apparatus, the shape of the compartments of the fluidic chain is characterized in that the cross section through each compartment and/or image compartment, at least in one sectional plane, is elliptical, quasi-elliptical or rounded, and the cross section is tapered so that it narrows toward the respective neighboring compartment. This at least one sectional plane must thereby extend along the longitudinal axis of the respective compartment. To that extent, for example, the sectional planes in question are those seen in an overhead view and/or a side view of the fluid chain or of the respective compartment.

In one particularly preferred embodiment, the respective compartment has the above mentioned preferred cross section shape in both of the sectional planes described above. A side view which would be oriented at a right angle to the longitudinal axis of a compartment would then show an essentially symmetrical or rotationally symmetrical cross section.

The greatest preference is thereby given to the elliptical or quasi-elliptical cross sectional shape.

In an additional preferred embodiment, the individual compartments or the image compartment are formed by a channel with essentially flat side walls which has periodic tapers on at least two opposite sides (contractions of the cross section) which taper the channel. The shape of these tapers claimed by the invention can be both sharp-edged or rounded. Both a pin-shaped, small-volume reduction of the cross section and a prismatic or rectangular reduction of the cross section are possible. The reductions of the cross section can also be shaped so that they promote the movement of the colored fluids in one direction (preferential direction), and make movement more difficult in the other direction (inhibiting direction). In the preferential direction, for example, shapes of this type can have inclined triangular cross sections or correspondingly inclined curved cross sections.

In one embodiment, each compartment has four side walls which form the boundaries of the compartment laterally and on the top and bottom. It is thereby possible for the periodic reductions of the cross section to be present on exactly two opposite side walls, or on three side walls or on all four side walls. In another embodiment, however, the invention teaches that it is also possible to provide the compartment, instead of with an essentially triangular cross section, with a round or oval cross section instead, for example. In this case the periodic reductions in cross section each preferably run along the entire periphery of the respective compartment.

The tapers claimed by the invention preferably reduce the cross section of the respective compartment by a minimum of 5% and a maximum of 30%.

It is also preferable for the respective length of a taper to be either not more than 100 μm or at least 20% of the length of the compartment. In the first case, the corresponding tapers are therefore only indicated, although they can be sufficient, if necessary, to delimit one compartment from the next compartment.

As mentioned above, each fluidic chain of the apparatus claimed by the invention comprises at least two colors, whereby by definition the colors black, white and transparent are also considered colors within the meaning of the invention. To cover the greatest possible color space, there are certain combinations of a plurality of colored fluids which are with particular preference contained in the compartments of a fluidic chain. The sequence of the colors within a pattern preferred by the invention is theoretically whatever is desired; it is particularly preferred, however, if the sequence of colors is always the same over all the subpixels of a display.

Basically the compartments of the at least one subpixel can comprise colors which are arranged according to the pattern red-green-blue or cyan-magenta-yellow.

For an accurate color display, it is also generally necessary to supplement the pattern described above with the (uncolored) colors black and/or white.

It is therefore particularly preferable for a single fluidic chain of the apparatus claimed by the invention to comprise a pattern which comprises the colors red, green, blue, cyan, magenta, yellow, black and white.

With the use of a color pattern described by the invention in a single fluidic chain it is thereby possible to cover a particular large color space, especially when the colors of a plurality of subpixels are optically merged into a single color. Therefore there are certain particularly preferred geometric arrangements of subpixels or pixels that can produce this impression claimed by the invention. Therefore, with the use of a plurality of pixels, displays are possible which can display images, and with a high color and/or structure resolution.

In a first embodiment of the apparatus claimed by the invention, the subpixel image apertures of each pixel are sized and arranged so that they lie one on top of the other and are simultaneously within the pixel image aperture. The subpixel image apertures must thereby be created down to the bottommost subpixel, so that they not only show the respective image compartment of the subpixel, but also allow a view of the image compartments of the other subpixel or subpixels lying underneath. The invention teaches that it is necessary for the colored fluids used in the fluidic chains to be translucent, i.e. not completely opaque, because otherwise the color of the individual image compartment lying above would be the only visible color seen by an observer, unless the top image compartment were empty or its contents were transparent.

It is particularly preferable if underneath the bottommost sub-pixel aperture there are additional means for illumination, which can be active, for example a light bulb or light-emitting diode, or passive, such as a surface that reflects an external light, for example.

In a second embodiment of the apparatus claimed by the invention, the subpixel image apertures of each pixel are sized and arranged so that they lie immediately next to one another and are inside the pixel image aperture. "Immediately next to one another" means that when viewed from a normal observation distance, they give the impression that the contents of the subpixel image apertures lying next to one another optically merge with one another, so that they form a corresponding mixed color impression. The subpixels are advantageously configured so that they can fit as closely as possible to one another, in particular in the area of the subpixel image apertures.

Preferred arrangements of the subpixels can be an arrangement in rows that run parallel, or an arrangement in a preferably regularly shaped polygon. In the latter case, the subpixel image apertures lie preferably in or near the center of the polygon.

In each case the pixel image aperture of the pixel claimed by the invention is located and sized so that it comprises all of the subpixel image apertures of the respective pixel.

In one preferred embodiment of the apparatus claimed by the invention, significant parts of the fluidic chain run in a double strand. That means that the fluidic chain consists essentially of two parts (sub-strands), which are not necessarily but are preferably essentially linear, but in any case run essentially parallel to each other. The invention teaches that it is necessary for these two strands to be in fluidic communication with each other, because otherwise they would not form a cohesive fluidic chain. The invention teaches that this communication is created by a connecting channel section which is located on one or the other end of the double strand, so that an open fluidic chain is formed. The connecting channel section, however, can also be located on both ends so that a closed fluidic chain is formed (fluidic circuit).

It is particularly preferable to locate the image compartment of the fluidic chain on one end of the double strand. The greatest preference is given to a layout in which the position of the connecting channel section described above coincides with the position of the image compartment, or having both functions performed by the same assembly or component.

The greatest preference is given to an embodiment in which the sub-strands run in a linear path and are fluidically connected with each other on both ends so that the result is a fluidic circuit, and in which also one of these two connections simultaneously contains the image compartment.

In another embodiment of the apparatus claimed by the invention, the subpixel image aperture is formed by covering, on the side of at least one additional subpixel that faces the observer, all of the areas that lie outside the subpixel image aperture. That means that, for example, the subpixel lying underneath can be completely transparent, but on account of the subpixel that lies on top of it, which in that case cannot be transparent, all the areas of the subpixel lying underneath which are not supposed to be visible to an observer are covered. The subpixel image aperture is accordingly characterized not by specified constructive features of the corresponding subpixel, but by the positioning of the corresponding subpixel in relation to its surroundings.

In an alternative embodiment, the areas of the subpixel which are accordingly concealed from an observer are shielded by a cover. This cover can be created by a coloration of the external surface, for example, by addition parts such as films or plates or by other constructive elements.

In an arrangement of two or more subpixels, the result when viewed from the side is a cascade. Preferably, each three sub-pixels are combined into a cascade which then also represents one pixel. In particular with extremely thin subpixels, however, more than these three subpixels can be combined into pixels and/or can be stacked one on top of another to form a cascade.

For the case in which the fluidic chain is inside a subpixel in the form of a double strand, and in which the image compartment is located at one end of this double strand, in a particularly preferred embodiment of the invention, the subpixel image aperture or the image compartment are also located and oriented so that the other compartments of the subpixel, when viewed from the direction of an observer, are located underneath the subpixel image aperture located on one end of the double stand, so that they are covered by it. The greatest preference is thereby given to an essentially vertical orientation of the double strand, with the image compartment on the upper end or the end pointing toward the observer. Simultaneously, the dimensions of the subpixel image aperture must be specified so that the two double strands located underneath it are completely covered by the subpixel image aperture.

In an additional preferred embodiment which comprises at least two pixels claimed by the invention, these at least two pixels are located one on top of the other so that only the respective pixel image aperture is visible to an observer. This construction is essentially the same as the cascade construction of subpixels; the result is accordingly a cascade of pixels. The number of pixels that can be stacked one on top of another is thereby a function of the thickness of the individual pixels, viewed from the direction of an observer. Analogous to the sub-pixel cascade structure, here again the pixel image aperture results simply from the fact that the other parts of the respective pixel are covered by the pixel lying on top of it. In an alternative embodiment, this covering function can also be performed by a cover.

In another embodiment for which both the construction variants, i.e. with the pixels next to one another and stacked on top of one another, are appropriate, at least two pixels are located next to each other so that only the respective pixel image aperture is visible to an observer. The pixels are correspondingly oriented essentially vertically when viewed from the direction of an observer. In that case, the corresponding subpixels are also particularly preferably oriented vertically. Consequently, the parts of the subpixel that lie underneath the respective image compartments are invisible to an observer, because they are covered by the image compartment.

In general terms, in this particularly preferred embodiment the subpixel image surface visible from the direction of an observer corresponds essentially to the total cross section surface of the image compartment and/or of the double strand viewed from the same direction. The cross section surfaces can thereby be both round and polygonal or cornered, whereby an essentially square form is particularly preferred. In any case, an approximate congruence of the two cross section surfaces is advantageous. It is also advantageous if the size of the image compartment essentially equals the size of the subpixel image aperture, because in that manner an optimum utilization of the available image surface of the pixel and thus of the display is guaranteed.

In an additional embodiment of the invention, the image compartment corresponding to a subpixel is elliptical, quasi-elliptical or rounded in at least one three-dimensional direction, and also has essentially the same volume as one of the other compartments of the respective fluidic chain. On account of the quasi-equality of the individual volumes, it can be ensured that each of the compartments, if a color droplet is located in it, is also completely filled by the color droplet and not, for example, only partly filled. It is also guaranteed that any spaces which can be caused by a carrier fluid or gas, for example, also remain intact during the transport of the colored fluids through the fluidic chain, because in no compartment is there sufficient space for a color droplet and a relatively large quantity of gas or even two color droplets. This feature also counteracts the danger of a mixing of color droplets and/or carrier fluid or gas with one another.

The invention teaches that it is advantageous if the position of certain colored fluids in the compartments of the fluidic chain of a subpixel claimed by the invention is known. Accordingly, means must be provided that make it possible to determine the position of a certain colored fluid and/or another auxiliary means which clearly identifies this position. For this purpose, the invention provides two particularly preferred realizations of the apparatus which can be used individually or jointly. For purposes of simplification, in the following description the image compartment is considered a sub-set of the other compartments of a fluidic chain and is accordingly also designated by the expression "compartment".

In a first embodiment, the individual colored fluids in the compartments are arranged so that between the compartments that contain colored fluids there is at least one space with a first perimeter with a determined number of compartments that do not contain colors. There is also exactly one space with a second perimeter which comprises a number of compartments that do not contain colored fluids that differs from the number of first-perimeter spaces. In other words, there is exactly one space with the second perimeter which indicates, for example, the beginning or the end of the specified sequence of colors (pattern). To detect this second-perimeter space, the invention also teaches that it there are means for the detection of this second-perimeter space.

The first-perimeter space can thereby preferably comprise one compartment. It is particularly preferable, however, if it does not comprise any compartment at all, which is therefore the same as saying that the means for detection must detect only an interruption in the color sequence of the colored fluids which exists in the compartments filled with colored fluid that otherwise come one right after another. The second-perimeter space preferably comprises exactly one compartment more than the first-perimeter space, to keep the number of unoccupied compartments within a fluidic chain as low as possible.

It is particularly preferable if the means for the detection of the second-perimeter space are selected so that they can detect effects from the group comprising capacitive, inductive, optical and/or resistive effects. A capacitive means for detection can provide electrodes, for example, on the edges of a selected compartment of the fluidic chain, to which electrodes a voltage is applied. In the presence of a fluid, the dielectric constant of which is different from that of an empty compartment, the electrical field between the electrodes changes, so that this change can be detected. An optical means for detection can, for example, detect the light absorbed by a fluid which enters a previously empty compartment. A resistive means for detection can use two electrodes that project into the interior of a compartment to detect the change in resistance that results between an empty compartment or a compartment filled with carrier fluid and a compartment filled with colored fluid.

With regard to the above mentioned first-perimeter and second-perimeter spaces respectively, it is accordingly preferable if the number of compartments including the image compartment equals exactly twice the number of colors plus 1. When this formula is used, the result is a fluidic chain in which a filled and an empty compartment occur in alternation, and a space consisting of two empty compartments is originated in exactly one spot.

The other preferred embodiment also described above, in which all of the compartments except one are filled with colored fluid, can also be described by saying that the number of compartments including the image compartment equals exactly the number of colored fluids plus 1.

As also mentioned above, there is an additional particularly preferred embodiment which also makes possible the detection of the position of a certain colored fluid inside the fluidic chain. Accordingly, the invention teaches that the apparatus has, in addition to or as an alternative to the means for the detection of the second-perimeter space, means for the detection of at least one of the colored fluids. By the detection of a certain colored fluid which is present in the fluidic chain, the position of all the other colored fluids can also be determined, provided that the sequence of these colored fluids has been clearly specified by the manufacturing process, for example. These means for the detection of at least one of the colored fluids can, for example, determine the wavelength of light which penetrates through the corresponding compartment which is in communication with the means for the detection of at least one of the colored fluids. If the colored fluids that are present in the fluidic chain have different electrical resistances, a corresponding resistance measurement can also be used for the detection of a specified colored fluid.

As a result of the use of means for the detection of at least one of the colored fluids, it is also particularly preferable to eliminate the presence of one or more spaces, i.e. compartments that are not filled with any colored fluid, because these spaces are no longer necessary for the determination of the position of the colored fluids within the fluid chain.

The invention further teaches that it is advantageous if the apparatus additionally or alternatively comprises means for the storage and retrieval of the position of the second-perimeter space or the position of at least one of the colored fluids. It is thereby possible at any time to retrieve information on the corresponding position of the fluidic chain within the subpixel and, for example, to transmit the information to a higher-level control system. This measure is necessary in particular if, for the display of a particular colored fluid which is present in the fluidic chain, the objective is not to perform a new initialization of the chain every time, but to transport that colored fluid into the image compartment directly and over the shortest possible route as required in the image compartment as a result of the signal from a higher-level control system.

Therefore in one preferred embodiment of the apparatus claimed by the invention, the apparatus also comprises an actuator unit for the processing of the image to be displayed and for trans-mission to the pixels and/or subpixels. In other words, the actuator unit receives information about the image to be displayed and distributes this information, after appropriate processing, to the pixels and/or subpixels of the display.

It is particularly advantageous, however, if the pixels have their own, lower-level actuator units which automatically convert the request to display a certain color into the corresponding actuator pulses for the means of transport, without the higher-level actuator unit needing to know the exact composition of the individual fluidic chains or their colors. One advantage of this distributed information processing is that the higher-level actuator unit is relieved of a major part of the calculation work. An additional advantage is that in the event of a change of the pixel type in several or even all of the positions of the display, no change in the higher-level actuator system is necessary, because the latter does not have or need any detailed information about the internal life of the pixels or subpixels.

In an additional embodiment, each pixel and/or each sub-pixel comprises at least one identifier to make it unambiguously distinguishable from all the others. For example, this identifier can be an RFID mark or a code which is transmitted on request, wirelessly for example, and which makes each pixel within the overall display clearly identifiable. It is particularly preferable, however, if this identifier can be used universally, i.e. if it identifies precisely this one and only pixel within the entire quantity of pixels installed in a display claimed by the invention.

It is also advantageous if the apparatus claimed by the invention comprises a communications unit for unilateral or bilateral communication with the actuator unit. The invention teaches that by means of this actuator unit, it is possible to exchange information between the actuator unit and the individual pixels and/or subpixels.

This communications unit can be wired or it can particularly advantageously be operated wirelessly. The latter variant has the advantage that the large number of individual control lines can be omitted, and that the replacement of a defective pixel can also be done quickly and easily without corresponding wiring tasks.

The apparatus claimed by the invention is characterized in that the fluidic and/or the electronic components of the pixels or sub-pixels are made essentially of plastics and can be manufactured by means of mass production methods. These methods include, for example, injection molding, nanoimprint processes or hot stamping. It is also advantageous if the electronic components can be manufactured by means of corresponding methods such as, for example, the printing of electronic components on plastic substrates.

In short, therefore, the apparatus claimed by the invention for the display of color information (color display) consists essentially of a plurality of pixels which comprise at least one, some or all of the characteristics described above.

In an additional preferred embodiment, the apparatus claimed by the invention is characterized in that the sub-pixels and the pixels are made of a flexible material. The invention thereby makes it possible to impart a certain degree of flexibility to at least significant portions of the display so that the display elements can be applied to curved surfaces such as motor vehicle dashboards or advertising columns. Particular preference is given to the use of plastic films for this purpose. In that case, all that is necessary is to ensure that even if the display element bends, it can be guaranteed at all times that the fluidic connections between the individual compartments and the image compartment are kept sufficiently wide open so that the colored fluids can always be transported within the fluidic chain and that any electronic components of the sub-pixels and pixels that may be necessary are also realized so that they are flexible. In addition to the apparatus claimed by the invention and described above, the invention also relates to a method for the display of color information (color display) utilizing the corresponding apparatus. The invention teaches that this apparatus comprises at least one individual pixel, the color of which is variable, whereby the pixel consists of at least one sub-pixel, and whereby the sub-pixel comprises a fluidic chain in the form of a plurality of compartments to hold and keep separate certain specified colors that are present in fluid form, between which compartments these fluids can be transported in channels, and whereby the fluidic chain of the respective sub-pixel further comprises an image compartment with an aperture (sub-pixel image aperture), through which exclusively the current contents of the image compartment are visible to an observer. The apparatus further comprises at least one pixel image aperture, through which essentially only the respective sub-pixel image aperture or apertures are visible. The apparatus also comprises at least one means for the transport of the colored fluids.

The core of the method claimed by the invention thereby comprises the following steps:

First, the position of at least one of the colored fluids in each sub-pixel is determined.

Then the desired colored fluid is transported into the sub-pixel image aperture using the means for the transport of the colored fluids.

If the apparatus claimed by the invention comprises corresponding means for actuation (actuation unit), the method claimed by the invention can also include the steps described below:

First, a determination is made of those color combinations of the colors of all the sub-pixels of a pixel which come closest to a desired color impression. The desired color impression is thereby specified by the higher-level actuator unit. The determination of the corresponding color combination inside the pixel can thereby also be made by the higher-level actuator unit or preferably by a lower-level actuator unit which is located inside the pixel or is associated with it.

Then the desired colored fluid is transported into the respective sub-pixel image aperture of the respective pixel.

If the apparatus claimed by the invention, for the purpose of the determination of the position of at least one of the colored fluids, comprises means for the detection of a second-perimeter space, the following processes are performed simultaneously for the determination of the position of at least one of the colored fluids.

Transport of the colored fluids

Operation of the means for the detection of a second-perimeter space.

The performance of these processes continues until the means for the detection of a second-perimeter space detects this second-perimeter space.

In the event that the apparatus claimed by the invention comprises, for the purpose of the determination of the position of at least one of the colored fluids, alternatively or in addition to the means for the detection of a second-perimeter space described above, means for the detection of at least one of the colored fluids, the following processes are performed simultaneously for the determination of the position of at least one of the colored fluids.

Transport of the colored fluids

Operation of the means for the detection of at least one of the colored fluids.

These processes are in turn performed until the means for detection of at least one of the colored fluids detects at least one of these specified colored fluids.

If the apparatus claimed by the invention also comprises means for the storage and retrieval of the position of the second-perimeter space or the position of at least one of the colored fluids, the determination of the second-perimeter space and/or of the position of at least one of the colored fluids is determined by performing the steps described below:

before the initial operation of each sub-pixel, a one-time initiation of the sub-pixel in question takes place;

during operation, when a change in position of the second-dimension space and/or of the position of at least one of the colored fluids is necessary, the resulting new position is stored, so that the respective position can be retrieved or is retrieved before repeated operation.

The current position can thereby be retrieved, for example, by the higher-level actuator unit or, if one is present, by the lower-level actuator unit of the individual pixel or sub-pixel, so that the corresponding actuator unit is capable of determining the respective shortest transport path which is necessary to transport the desired colored fluids into the respective image compartment of the corresponding sub-pixel.

The apparatus claimed by the invention, as described above, makes possible the display of colored information with the use of individual pixels. By means of an appropriate selection of pigmented and carrier fluids, if any, the invention teaches that it is possible to operate the display at extremely low and also high temperatures [Translator's note: The German text says, "... und auch ohne Temperaturen ...", which is "... and even without temperatures ...," although that is presumably an error for "ho-hen Temperaturen"—"high temperatures".] without the fluid freezing or boiling, respectively and consequently shutting down or damaging the display.

Only a small amount of energy is required for the operation of the apparatus claimed by the invention, because especially for the display of static information, no transport of colored fluids takes place, which means that no energy is necessary for the transport of the colored fluids.

As a result of the modular construction of the display, i.e. its subdivision into sub-pixels or pixels, the invention teaches that it is easily possible to replace individual sub-pixels or pixels, for example when they become defective. In this manner an economical repair of the display is possible, as well as, if necessary, an adaptation or expansion to include additional colors, without having to replace the entire display instrument.

As a result of the preferred use of eight colors taught by the invention in connection with an optical color mixing effect, a color space can be represented that is sufficient at least for the presentation of the information typically used on advertising posters.

Finally, the apparatus claimed by the invention, when flexible substrates are used, makes possible a certain degree of flexibility, so that a display based on the invention can also be installed in significant portions on curved surfaces.

DESCRIPTION OF THE FIGURES

FIG. 13 shows in table form the number of colors and the equivalent bits that can be displayed with a defined matrix of sub-pixels per pixel.

DESCRIPTION OF THE ACCOMPANYING FIGURES

Figure 1:
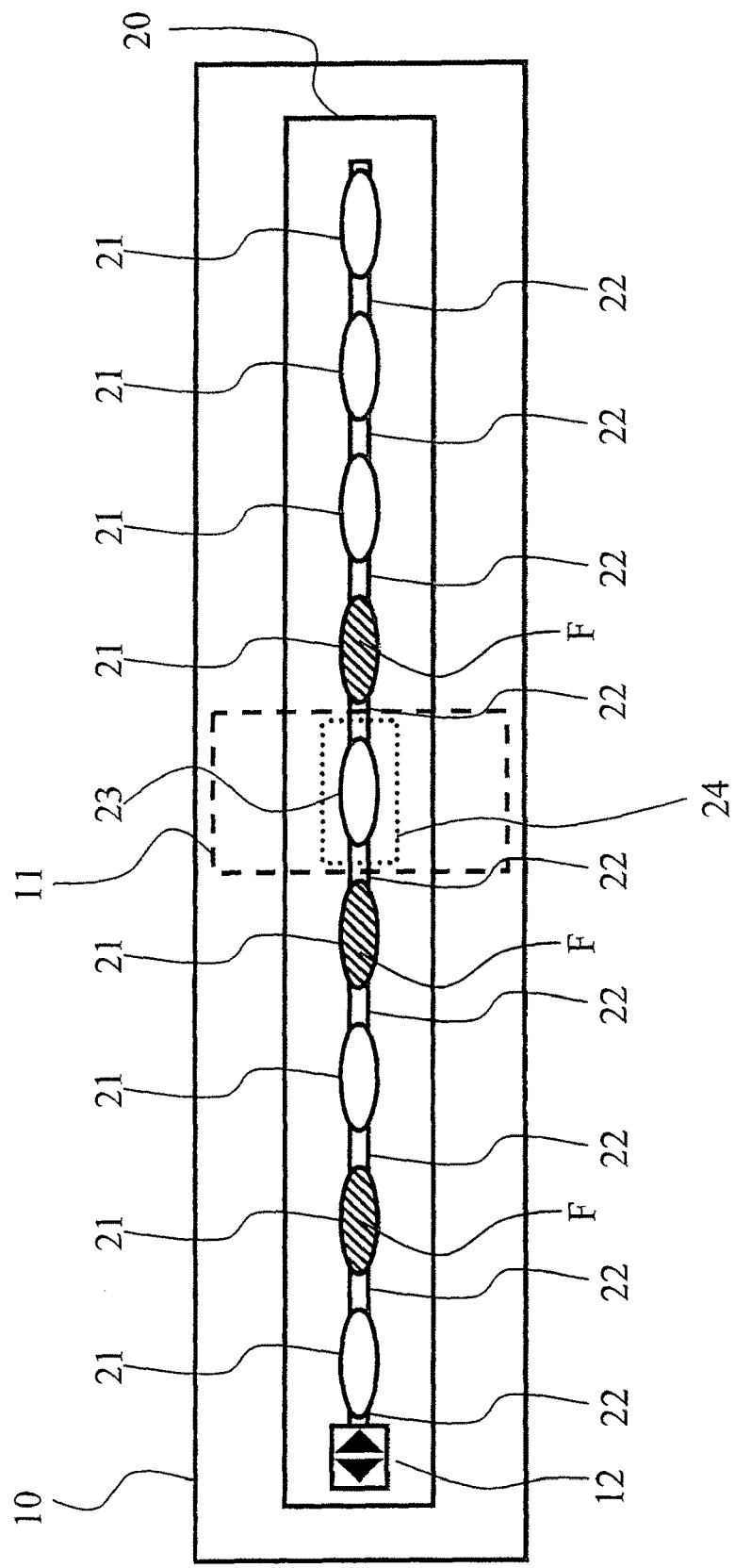
FIG. 1 shows the apparatus claimed by the invention, comprising a pixel 10, a sub-pixel 20 and additional elements.

FIG. 1 shows the apparatus claimed by the invention in a basic construction which includes all the essential elements of the apparatus.

Accordingly, the apparatus claimed by the invention consists of at least (in this case exactly) one pixel 10, the boundaries of which are indicated by the outermost polygon border. The pixel 10 also comprises a pixel image aperture 11, the boundaries of which are indicated in this and all the following figures by a thick broken line.

The invention teaches that the pixel 10 comprises at least one (in this case exactly one) sub-pixel 20, which is also indicated by a corresponding solid border. The sub-pixel contains a series of compartments 21, which are fluidically connected to one another by means of channels 22 and thus form a fluidic chain. Some of the compartments contain a colored fluid F (cross-hatching), while other compartments are shown empty, e.g. they do not contain any colored fluid, e.g. they contain air or a colorless carrier fluid. Not shown but otherwise preferred is the presence of colored fluids F which are not identical but are different in the compartments of a fluidic chain. One of these compartments is realized in the form of an image compartment 23. In the simplified drawing, this compartment does not differ externally from the neighboring compartments 21, although the invention teaches that it could if necessary. The image compartment 24 is located inside or underneath a sub-pixel image aperture 24, the boundaries of which in this and all the following figures are indicated by a thick dotted line. Through this sub-pixel image aperture 24, exclusively the image compartment 23 or its contents are visible from the outside. The invention teaches that all the other components of the sub-pixel must remain concealed from an observer. The sub-pixel 20 finally also comprises means for the transport 12 of the colored fluid F, which in FIG. 1 is located at the end of the fluidic chain. As a result of the transport of air, for example, into the fluidic chain, the colored fluids can be made to travel from one compartment 21 to the next and thereby also to pass through the image compartment 23. Depending on the colored fluid F which is currently in that compartment, a color impression is formed which can be perceived through the sub-pixel image aperture 23 and the pixel image aperture 11 from the outside. The means for the transport 12 of the colored fluid F are shown in FIG. 1 as bidirectionally acting means. Alternatively, two unidirectionally acting means could also be provided, which the invention teaches can also be located at different points of the fluidic chain.

Figure 2:
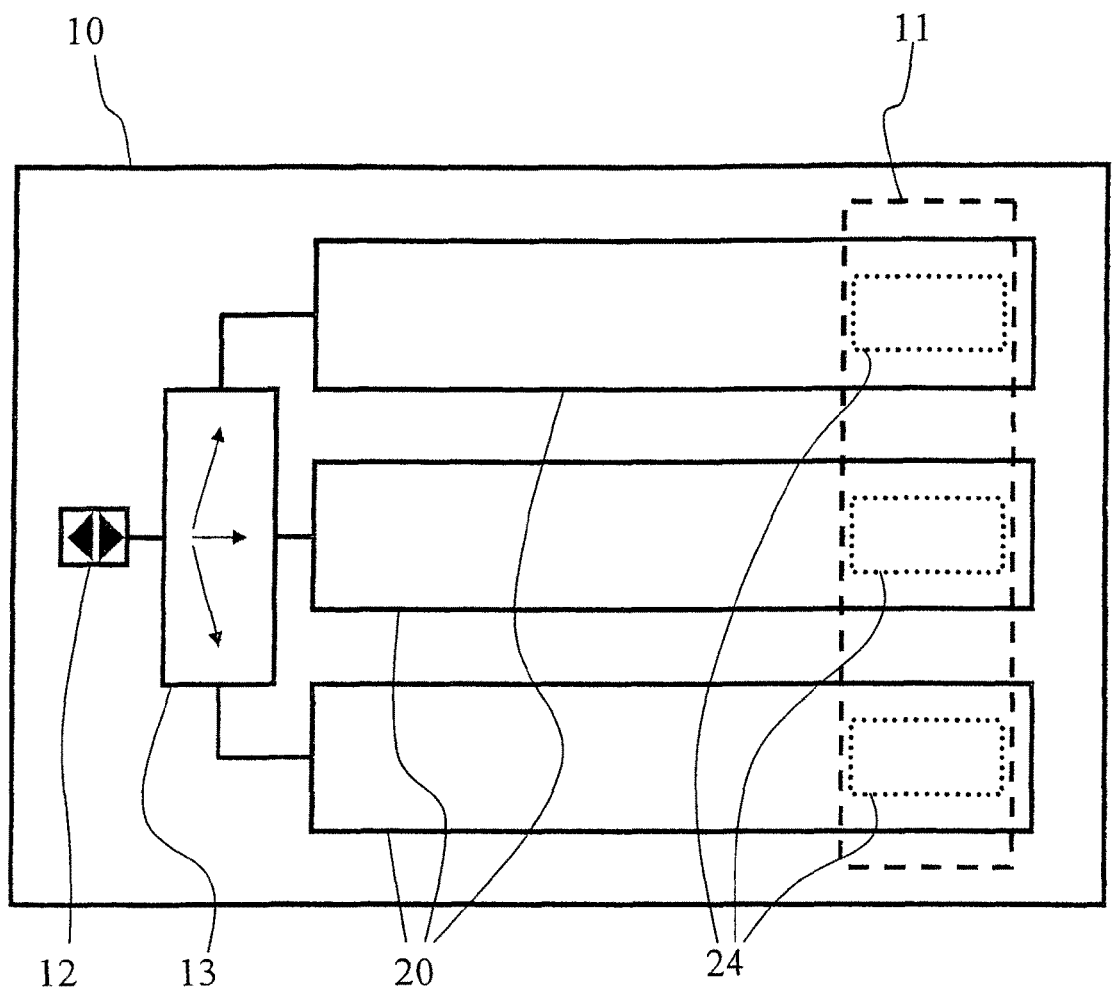
FIG. 2 shows the apparatus claimed by the invention, comprising essentially a pixel 10, three sub-pixels 20, means for the transport 12 of the colored fluids F and means for the selection 13 of the subpixel 20.

FIG. 2 shows an additional embodiment of the apparatus claimed by the invention. This embodiment comprises a pixel 10, three sub-pixels 20, means for the transport 12 of the colored fluids F and means for the selection 13 of the subpixel 20. In contrast to the variant illustrated in the preceding figure, not every sub-pixel therefore has its own means of transport 12, but three sib-pixels 20 share these means. Nevertheless, to be able to actuate each sub-pixel separately, means for the selection 13 of the subpixel are provided, which must be actuated in a form which is not described here in any further detail, to effect a transport of the respective colored fluids F present in the fluidic chain only in the desired subpixels 20. The corresponding necessary fluidic channels are only indicated in FIG. 2 by means of solid lines.

The figure does not show any difference between the colored fluids F of the respective fluidic chains. It is advantageous, however, to use different colored fluids F inside each chain, and it is particularly advantageous if the individual fluidic chains inside a pixel 10 also differ from one another in their color content and do not contain exclusively the same colored fluid F, so that inside a pixel 10, a greater color space can be covered with the mixing of different colored fluids F. These individual colored fluids F are visible from the outside through the respective sub-pixel image aperture 24 and are combined by a common pixel image aperture 11.

FIGS. 3A to 3D show parts of a fluidic chain with compartments 21 that are of different shapes.

Figure 3A:
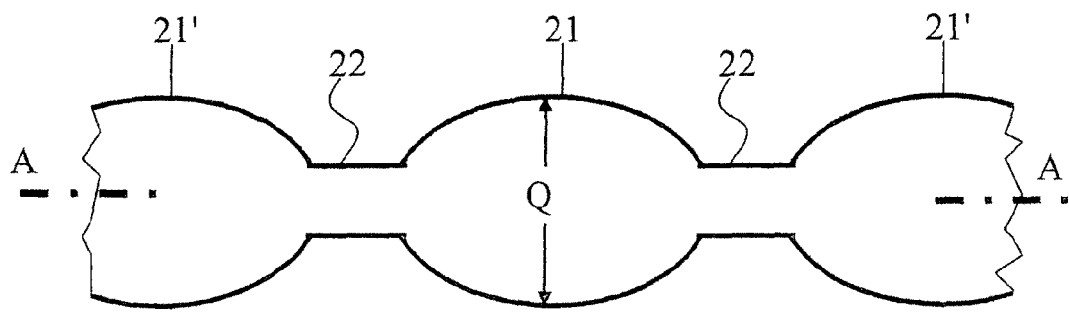
FIG. 3A shows a portion of a fluidic chain with elliptically shaped compartments 21 corresponding to the apparatus claimed by the invention in a first view.

FIG. 3A shows a portion of a fluidic chain with elliptically shaped compartments 21 corresponding to the apparatus claimed by the invention in a first view. This first view can be a plan view or a side view. The invention teaches that the cross section Q through the compartment 21, which can also be an image compartment 23, is elliptically shaped in at least a first sectional plane. In the illustrated shape, this sectional plane corresponds exactly to the plane of the page and runs essentially through the volumetric center of the respective compartment 21. The compartment 21 is separated by means of channels 22 from the neighboring compartments 21' and its cross section Q tapers accordingly toward the respective neighboring compartment 21'.

Figure 3B:
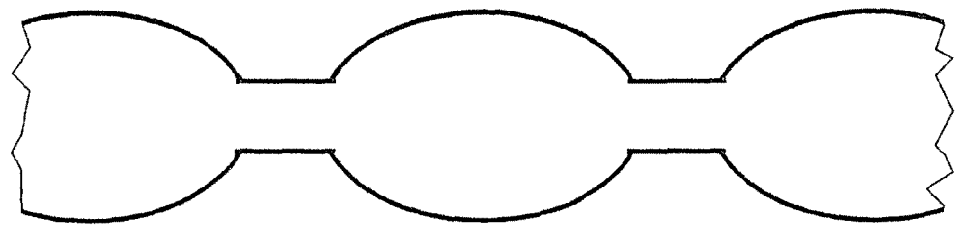
FIG. 3B shows a first sectional view of the fluidic chain illustrated in FIG. 3A along the section line A-A for the case of elliptically shaped compartments 21 in two sectional views.

For the case in which the elliptically shaped cross section of the compartment or compartments 21, 21' shown in FIG. 3A also extends into a second sectional plane which is perpendicular to the first sectional plane illustrated in FIG. 3A and runs along the broken line A-A, FIG. 3B shows a sectional view of FIG. 3A along the section line A-A. Accordingly, the compartments have essentially the same elliptical shape as in FIG. 3A. FIG. 3B therefore shows either a side view of the overhead view presented in FIG. 3A, or an overhead view of the side view presented in FIG. 3A.

Figure 3C:
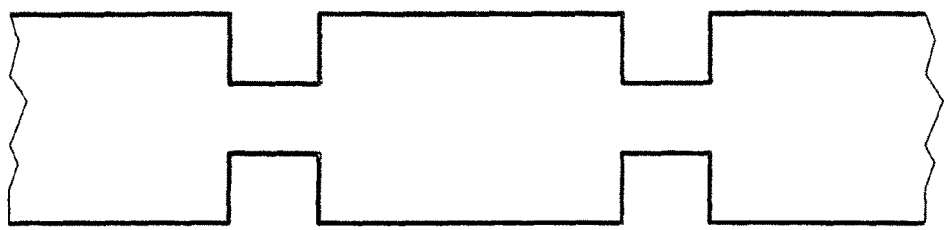
FIG. 3C shows a second sectional view of the fluidic chain illustrated in FIG. 3D along the section line A-A for the case of only two elliptically shaped compartments 21 in a sectional view.

For the case in which the elliptical cross section shown in FIG. 3A of the compartment or compartments 21, 21' exists only in the first cross sectional plane shown there, FIG. 3C shows a sectional view of FIG. 3A along the section line A-A. Accordingly, the compartments have a shape which is essentially rectangular.

Figure 3D:
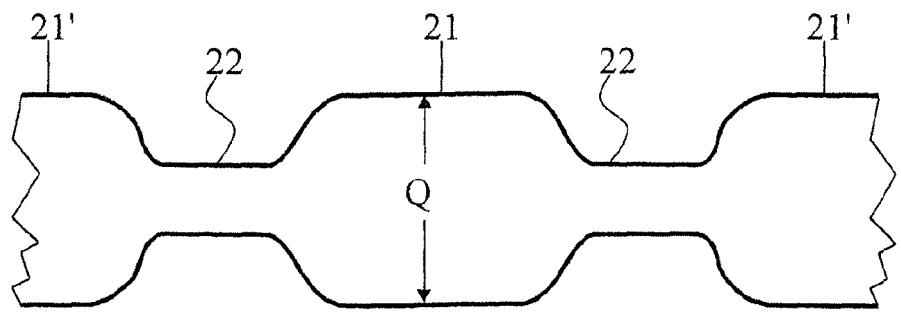
FIG. 3D shows a portion of a fluidic chain with rounded compartments 21 corresponding to the apparatus claimed by the invention.

FIG. 3D shows an additional cross sectional shape of the compartments 21, 21' claimed by the invention, in which the compartments are rounded toward the channels 22 that form their respective boundaries. Here, too, the cross section Q of a compartment is rounded toward the respective neighboring compartment 21'. Analogous to the case discussed in FIG. 3B above, this cross sectional shape can also include a second sectional plane, or alternatively the compartment can, analogous to the case described with reference to FIG. 3C, also have an essentially rectangular shape.

FIGS. 4A to 4E show a side view and a cross sectional view respectively of various types of the side wall structure of a channel 22, which lead to the realization of compartments 21, 21' claimed by the invention.

Figure 4A:
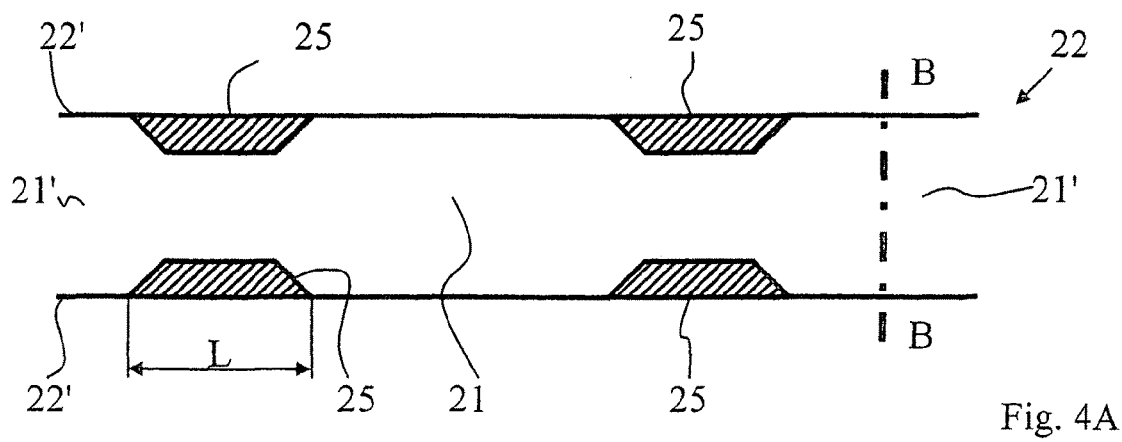
FIG. 4A shows a portion of a fluidic chain, the compartments 21, 21' of which are formed by periodic tapers of a first shape of exactly two flat facing side walls 22'.

Accordingly, FIG. 4A shows a channel 22 which comprises essentially flat side walls 22'. This shape, however, does not have to extend only in the longitudinal direction of the channel 22; the invention also includes round channel cross sections (see FIG. 4E). The side walls have periodic tapered sections 25. These tapered sections have a length L. The channel 22 is divided by the tapered sections claimed by the invention into a compartment 21 with neighboring compartments 21'.

Figure 4B:
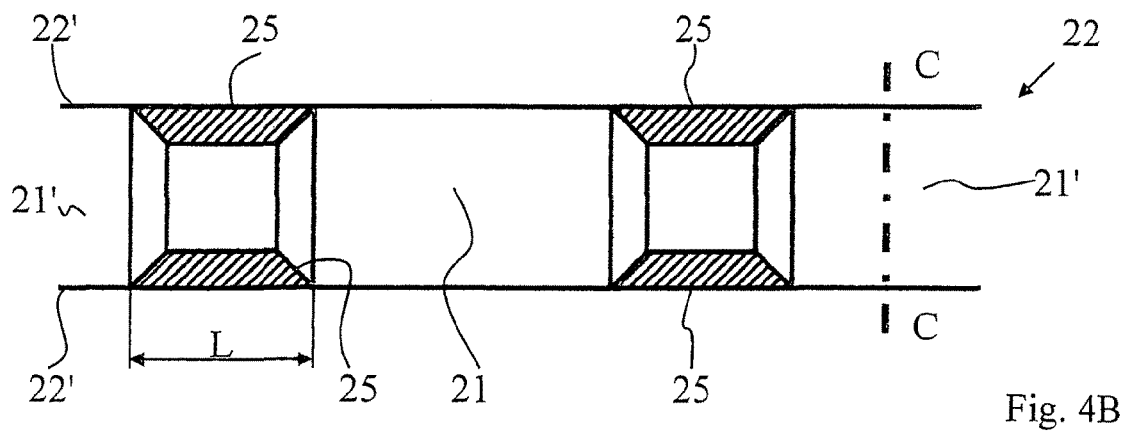
FIG. 4B shows a portion of a fluidic chain, the compartments (21), (21') of which are formed by periodic tapers of a first shape of all four flat side walls 22, as described in Claim 7.

FIG. 4B shows an embodiment which is similar to the one illustrated in FIG. 4A, although the periodic tapered sections 25 with the length L are located on all the side walls 22', i.e. over the entire periphery of the channel 22, and not only on two facing side walls 22', as illustrated in FIG. 4A.

Figures 4C, 4D, 4E:
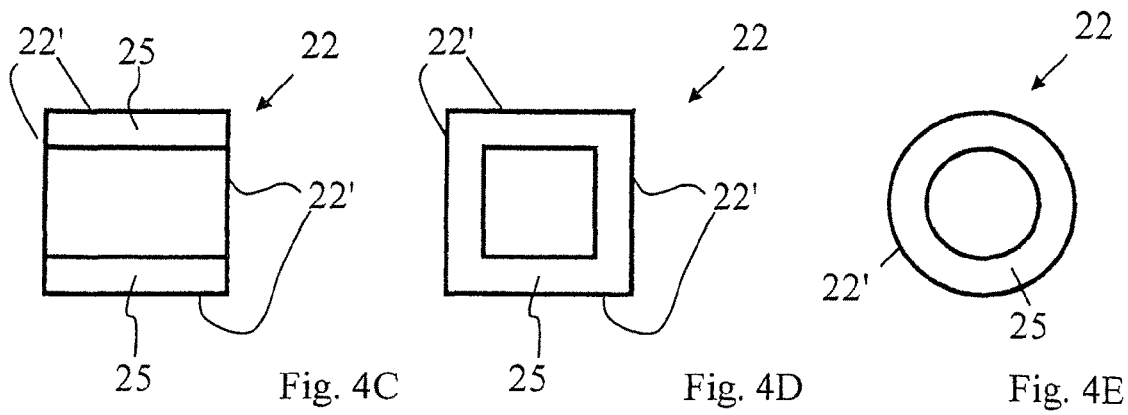
FIG. 4C shows a sectional view along the section line B-B of the portion of the fluidic chain illustrated in FIG. 4A.
FIG. 4D shows a sectional view along section line C-C of the portion of the fluidic chain illustrated in FIG. 4B.
FIG. 4E shows a section of a fluidic chain, the compartments (21) (21') of which are formed by periodic tapered portions of a second shape on at least two flat facing side walls 22', as described in Claim 7.

FIG. 4C shows a channel cross section corresponding to the section line B-B shown in FIG. 4A. The figure shows the four side walls 22' that form the boundaries of the channel 22 and periodic tapered sections 25 located on two facing side walls 22'.

Analogously, FIG. 4D shows a channel cross section corresponding to the section line C-C shown in FIG. 4B. The figure shows the side walls 22' that form the boundaries of the channel 22 and a periodic tapered section 25 which is located on all the side walls 22' which reduces the cross section of the channel 22 over the entire periphery.

FIG. 4E shows a cross section through a channel 22 claimed by the invention which is essentially round. The flatness of the side wall accordingly relates only to the longitudinal direction of the channel, which in FIG. 4E runs perpendicular to the plane of the page. The periodic taper 25 therefore runs in a ring shape along the entire periphery of the channel.

Figure 4F:
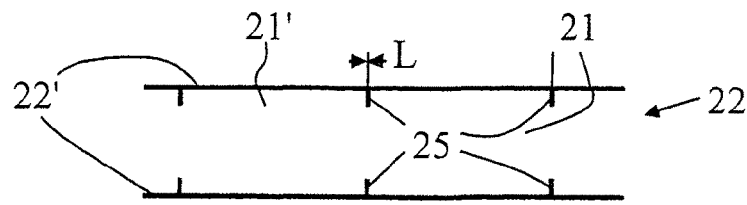
FIG. 4F shows an additional form of a channel claimed by the invention.

FIG. 4F shows an additional form of a channel 22 claimed by the invention in which the compartment 21 is formed by the neighboring compartments 21', whereby the periodic tapered sections 25 have a very small length L.

Figure 5A:
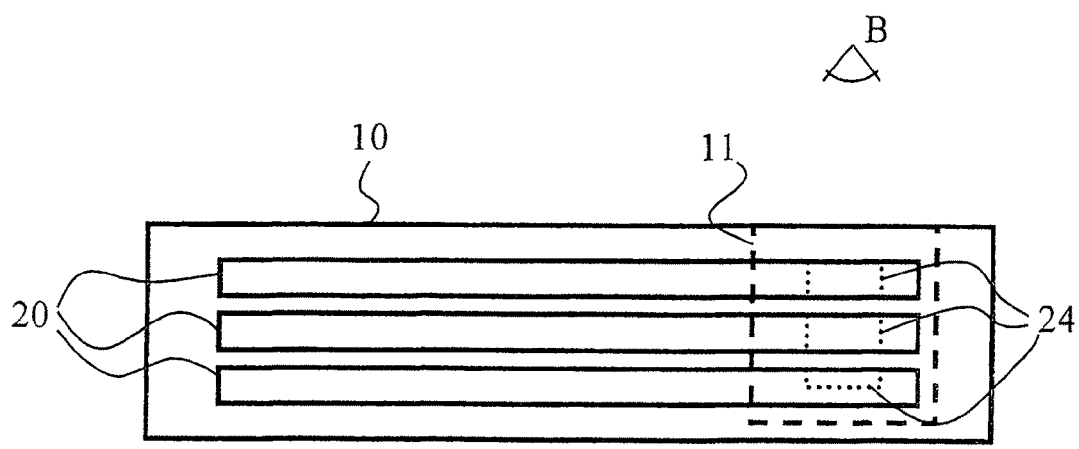
FIG. 5A shows a side view of one embodiment of the apparatus claimed by the invention, in which the color mixing inside a pixel 10 is brought about by three subpixels 20 lying one on top of another.
Figure 5B:
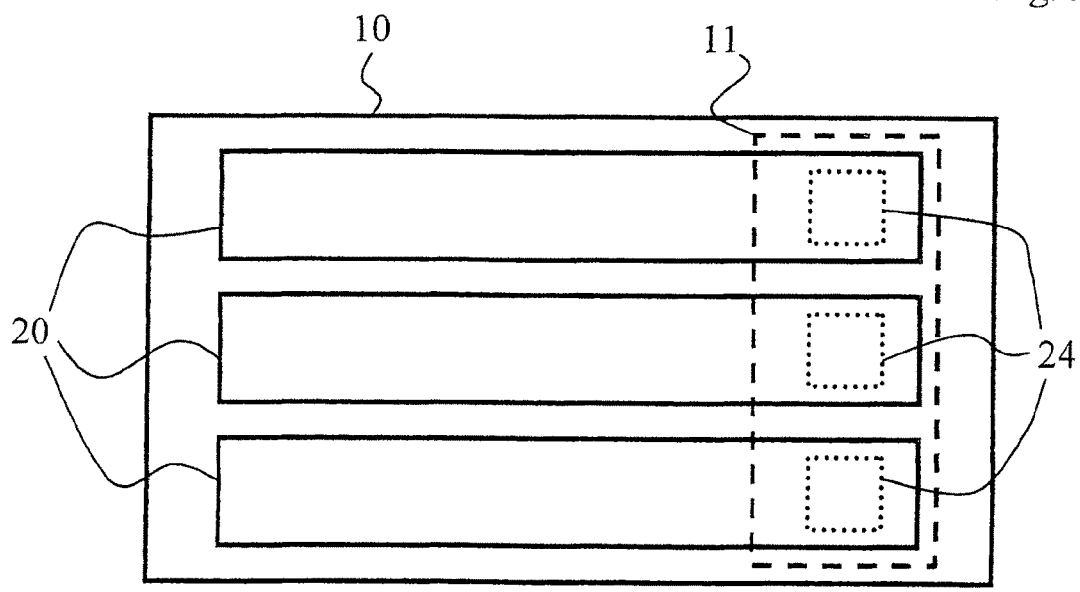
FIG. 5B shows an overhead view of an additional embodiment of the apparatus claimed by the invention, in which the color mixing inside a pixel 10 is brought about by three sub-pixels 20 lying next to one another.
Figure 5C:
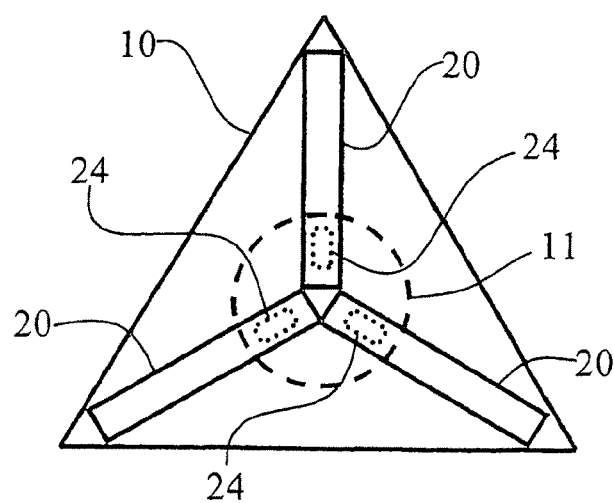
FIG. 5C shows a variant of the embodiment illustrated in FIG. 5B, in which the subpixels 20 each are at an angle of 120 degrees with respect to one another, so that the pixel has a triangular shape.

FIGS. 5A to 5C show various embodiments of the apparatus claimed by the invention, which are distinguished in particular by the location of the sub-pixels 20 inside a pixel 10.

In FIG. 5A the three sub-pixels are located one on top of the other when viewed from the direction of an observer B. Each of these sub-pixels 20 has its own sub-pixel image aperture 24. To be able to see the contents of the lowest sub-pixel 20, the sub-pixel image aperture 24 of the sub-pixel 20 that sits on top of its must be correspondingly transparent. This transparency is indicated by the dotted lines that each extend over the full thickness of the corresponding sub-pixel 20. The sub-pixel image apertures 24 are combined into a single optical unit by the pixel image aperture 11.

The color mixing effect claimed by the invention is achieved in this case by making all three colors F of the individual sub-pixels 20 visible simultaneously when viewed from the direction of an observer B.

FIG. 5B shows three sub-pixels 20 with sub-pixel image apertures 24 which are located next to one another inside the pixel image aperture 11 of a pixel 10.

The color mixing effect claimed by the invention is achieved in this case because, when viewed from the direction of an observer B, all three colored fluids F of the individual sub-pixel apertures 24 are located so close next to one another that when viewed from an appropriate distance they merge to product a single color impression.

Analogous to FIG. 5B, FIG. 5C shows an alternative arrangement of sub-pixels 20 lying next to one another with sub-pixel image apertures 24 which can be combined into one pixel image aperture 11 of a pixel 10. The sub-pixels are thereby arranged at an angle of 120 degrees with respect to one another, so that the shape of the pixel 10 is essentially triangular. Not shown is a variant of the illustrated embodiment in which the image compartments of the sub-pixels, viewed from the direction of an observer, have a shape which makes possible an optimized utilization of the visible area of the pixel image aperture (e.g. image compartments in the shape of a segment of a circle).

Figure 6A:
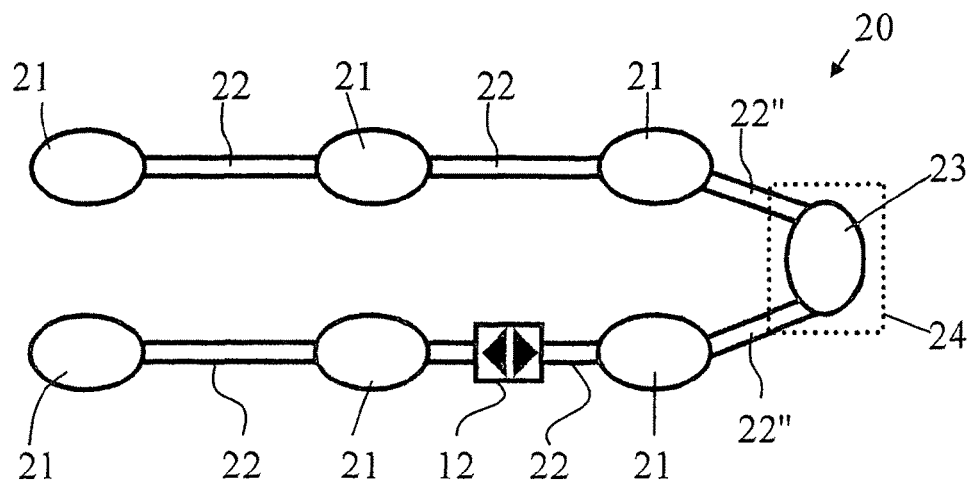
FIG. 6A shows the essential parts of a sub-pixel 20 claimed by the invention, in which the fluidic chain runs in the form of a double strand, with a bidirectionally acting means for the transport 12 of the colored fluid F.
Figure 6B:
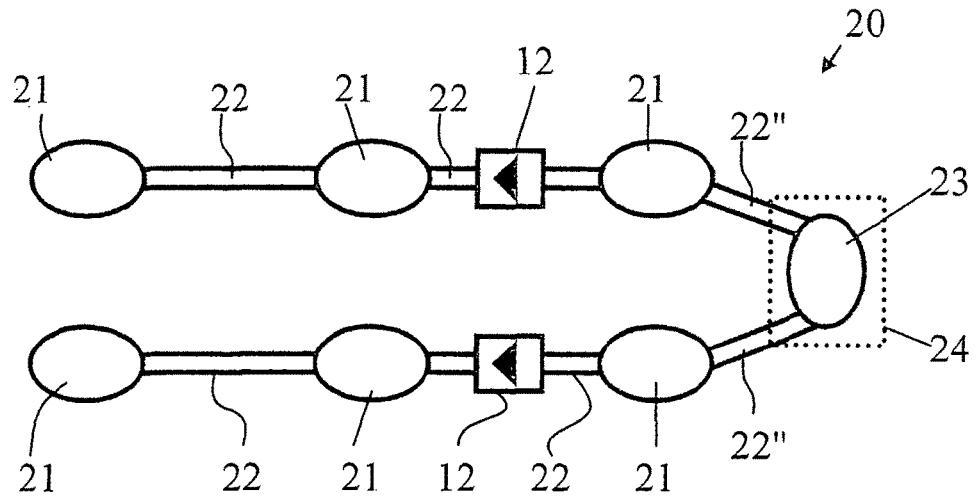
FIG. 6B shows the essential parts of a sub-pixel 20 claimed by the invention, in which the fluidic chain runs in the form of a double strand, with two unidirectionally acting means for the transport 12 of the colored fluids F.
Figure 6C:
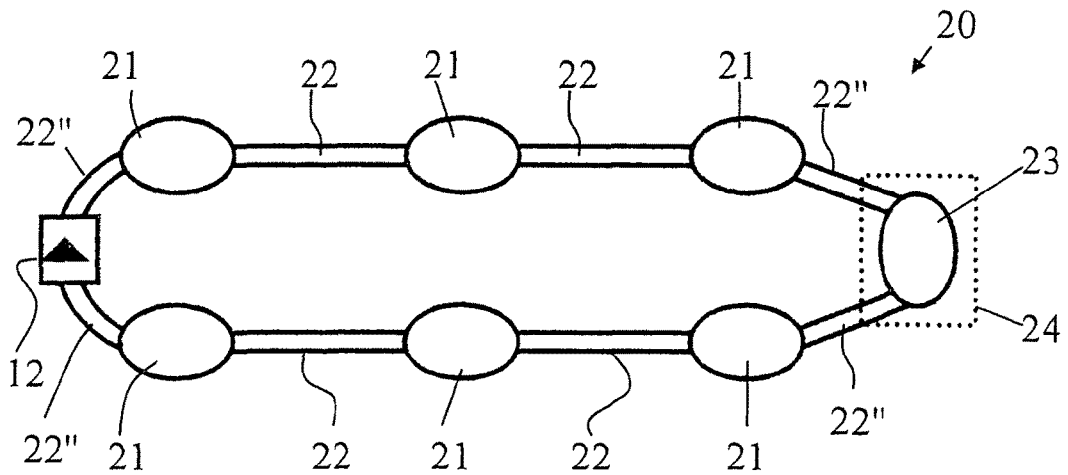
FIG. 6C shows the essential parts of a sub-pixel 20 claimed by the invention, in which the fluid chain runs in the form of a double strand, and which is arranged so that it forms a fluidic circuit.

FIGS. 6A to 6C show different embodiments of a sub-pixel 20 of the apparatus claimed by the invention, showing among other things the location of the means for transport 12 of the colored fluids F (not shown) and the fluidic connection of the compartments 21. In all the illustrations, the fluidic chain has the shape of a double strand.

FIG. 6A shows a single, bidirectionally acting means for transport 12 in the path of one of the channels 22 that connect the compartments 21 and the image compartment 23 with each other. The double strand claimed by the invention consists of two parallel segments of the fluidic chain, each of which comprises a plurality of compartments 21 and corresponding channels 22. The two segments are fluidically connected to each other by means of the image compartment 23, which is simultaneously the section 22" of the connecting channel that connects the two segments. The other end of the double strand is open, because the segments are not connected to each other at the corresponding end (each to the left in the figure).

FIG. 6B shows a structure similar to FIG. 6A of a subpixel 20 of the apparatus claimed by the invention, in which instead of a single, bidirectionally acting means for the transport 12 of the colored fluids F, there are two separate, unidirectionally acting means for transport 12.

Die FIG. 6C shows an additional embodiment of the apparatus similar to FIGS. 6A and 6B, in which there is only one unidirectionally-acting means for transport 12. The fluidic chain is also completely closed by means of a connecting channel segment 22", which is located on the end opposite the image compartment 23. Therefore the means for transport 12 can convey the contents of the fluidic chain in a circuit. The embodiment illustrated here is particularly advantageous.

Figure 7A:
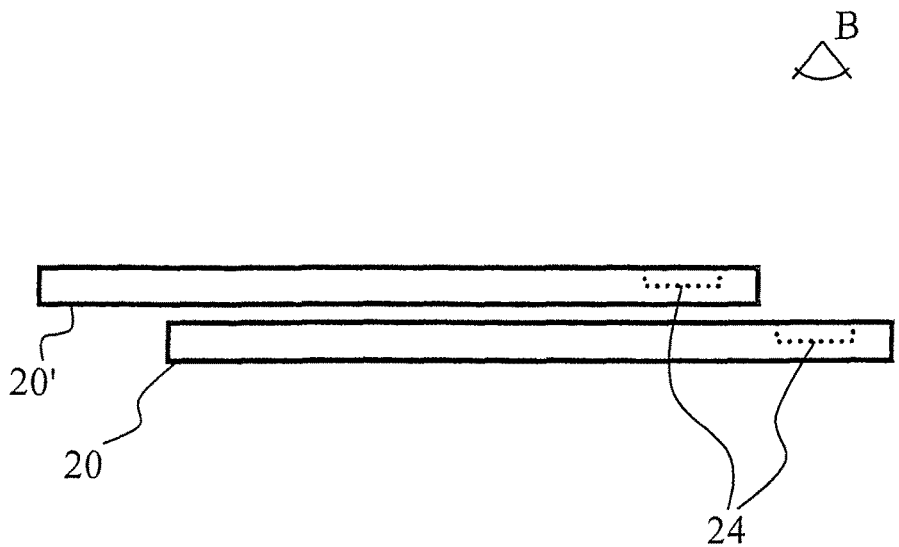
FIG. 7A shows an arrangement of two sub-pixels claimed by the invention, so that the subpixel image aperture 24 of a first pixel 20 results from the fact that its remaining parts are covered, from the direction of an observer B, by an additional subpixel 20'.
Figure 7B:
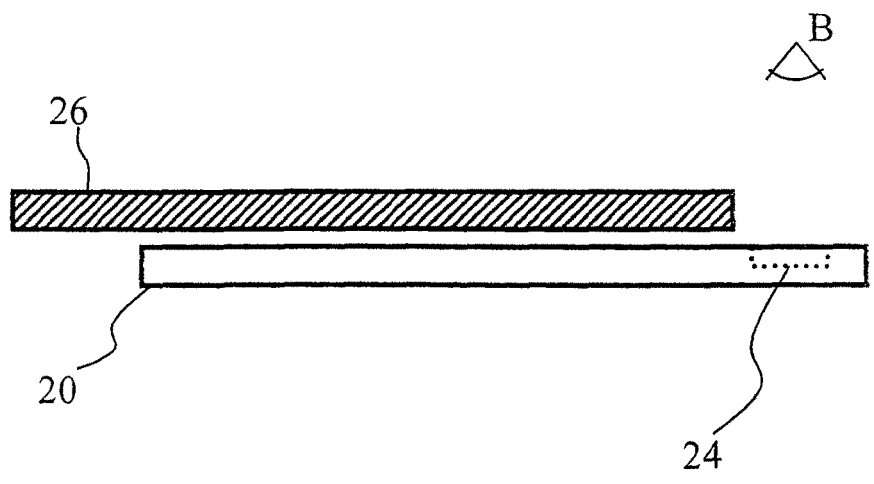
FIG. 7B shows an arrangement of two sub-pixels claimed by the invention, so that the subpixel image aperture 24 of a first pixel 20 results from the fact that its remaining parts are covered, from the direction of an observer B, by a cover 26.
Figure 7C:
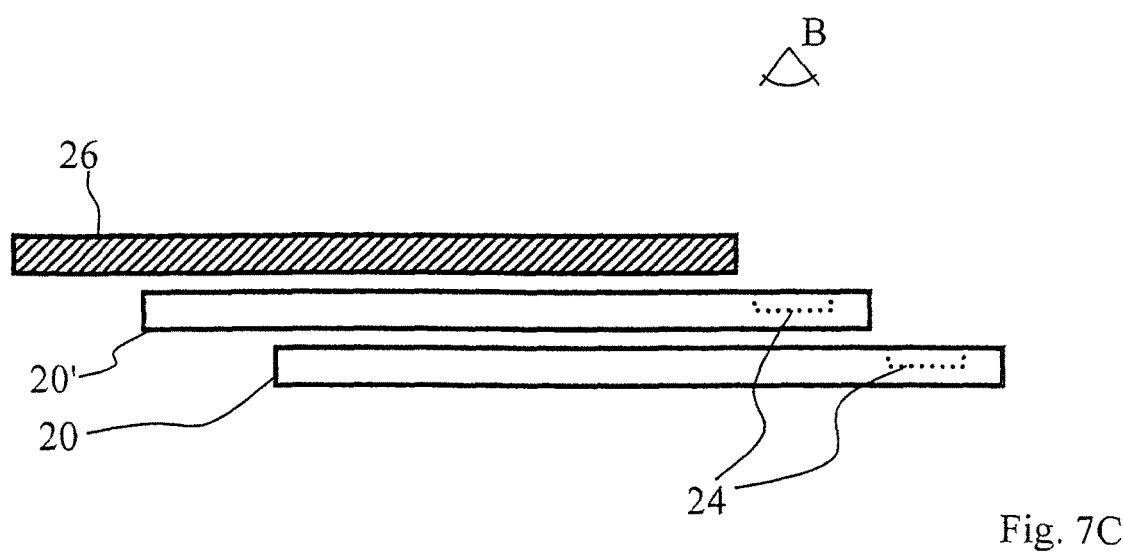
FIG. 7C shows a combination of the arrangements illustrated in FIGS. 7A and 7B.

FIGS. 7A to 7C show arrangements of sub-pixels 20 by which subpixel image apertures 24 are formed. The subpixel image aperture of the respective subpixel must thereby be located on one end of the subpixel.

FIG. 7A shows two subpixels 20 which, when viewed from the direction of an observer V, lie offset one above the other. The upper subpixel 20' thereby covers a significant portion of the lower subpixel 20, so that only the subpixel image aperture 24 of the lower subpixel is visible from the direction of an observer B. In the illustrated case, therefore, the remaining area of the lower subpixel 20 can be transparent, without the transparent area being visible to an observer B.

FIG. 7B shows an embodiment in which the sub-pixel aperture 24 of a sub-pixel 20 is formed by covering the remaining portion of the sub-pixel 20 by a cover, viewed from the direction of an observer B.

FIG. 7C shows a combination of the embodiments illustrated in FIGS. 7A and 7B. The subpixel image aperture 24 of the lower sub-pixel 20 is formed by the subpixel 20' which lies above it. The subpixel image aperture 24 of the upper subpixel 20' is formed by the cover 26 which lies on top of it. The invention teaches that additional sub-pixels 20 that are not shown can also be located offset underneath the subpixel 20 shown so that exclusively their subpixel image apertures are visible from the direction of an observer B.

Figure 8:
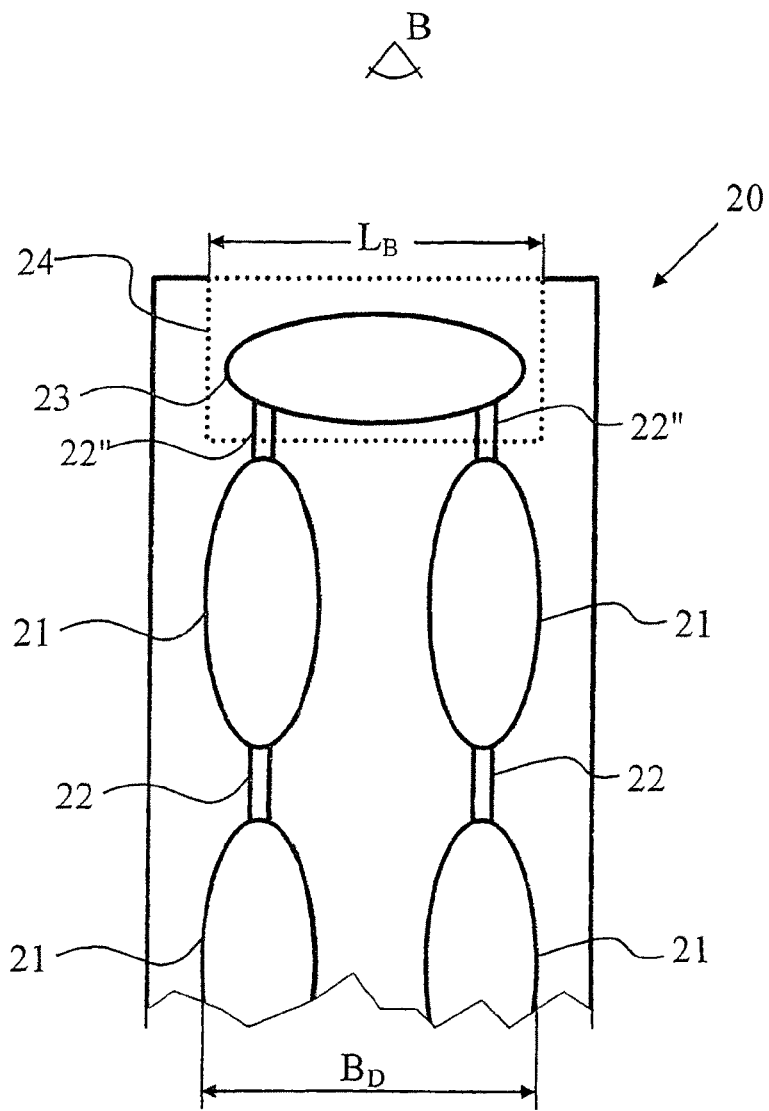
FIG. 8 shows the sectional view of an arrangement of the apparatus claimed by the invention, according to which the sub-pixel image aperture 24 is sized so that when viewed from the direction of an observer 8, it essentially covers the compartments 21 of the fluid chain lying underneath it.

FIG. 8 shows the sectional view of a portion of an arrangement of the apparatus claimed by the invention, in which the subpixel image aperture 24 of a sub-pixel 20 is sized so that it essentially covers the compartment 21 of the fluidic chain located underneath, seen from the direction of an observer B. The width $B_D$ of the double strand shown here thereby is essentially equal to the width $L_B$ of the subpixel image aperture 24 and of the image compartment 23. The image compartment 23 has the preferred quasi-elliptical cross section shape claimed by the invention.

Figure 9A:
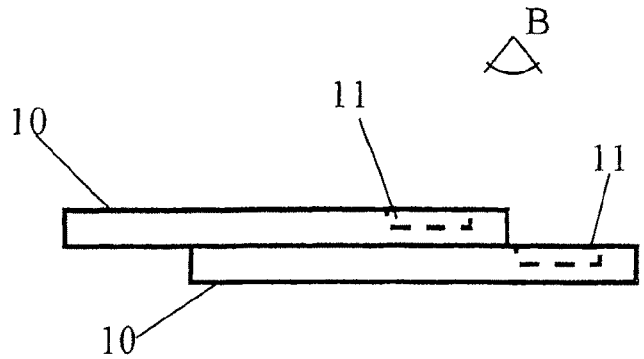
FIG. 9A shows an arrangement of two pixels 10 claimed by the invention, according to which two pixels 10 are arranged one on top of the other so that only the respective pixel image aperture 11 is visible to an observer B.
Figure 9B:
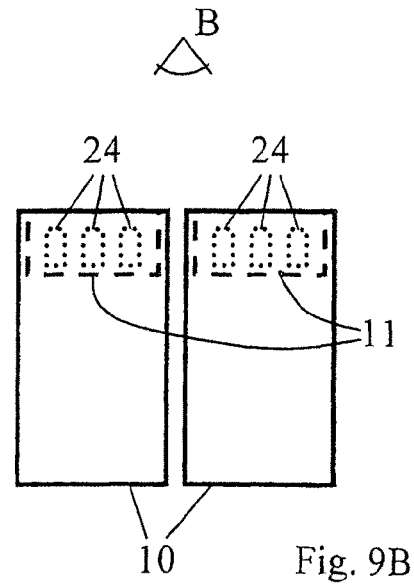
FIG. 9B shows an arrangement of two pixels 10 claimed by the invention, according to which two pixels 10 are located next to each other, and in which the color mixing inside a pixel 10 is achieved by subpixel image apertures 24 which are also located next to one another.

FIGS. 9A and 9B show two embodiments of the apparatus claimed by the invention, each of which shows two pixels 10 which are located either one above the other or next to each other.

FIG. 9A is essentially the same as FIG. 5A, with the distinction that instead of subpixels 20, pixels 10 are located one above the other, so that only the aperture (pixel image aperture 11) of the lower pixel 10 is visible from the direction of an observer B.

FIG. 9B shows an arrangement of two pixels 10 claimed by the invention in which two pixels 10 are located one on top of another, and in which the color mixing is achieved inside a pixel 10 by subpixel image apertures 24 which are also located next to each other, each of which is combined in a pixel image aperture 11. The subpixels, of which only the respective subpixel image apertures 24 are shown in FIG. 9B, are thereby particularly advantageous as illustrated in FIG. 8.

Figure 10:
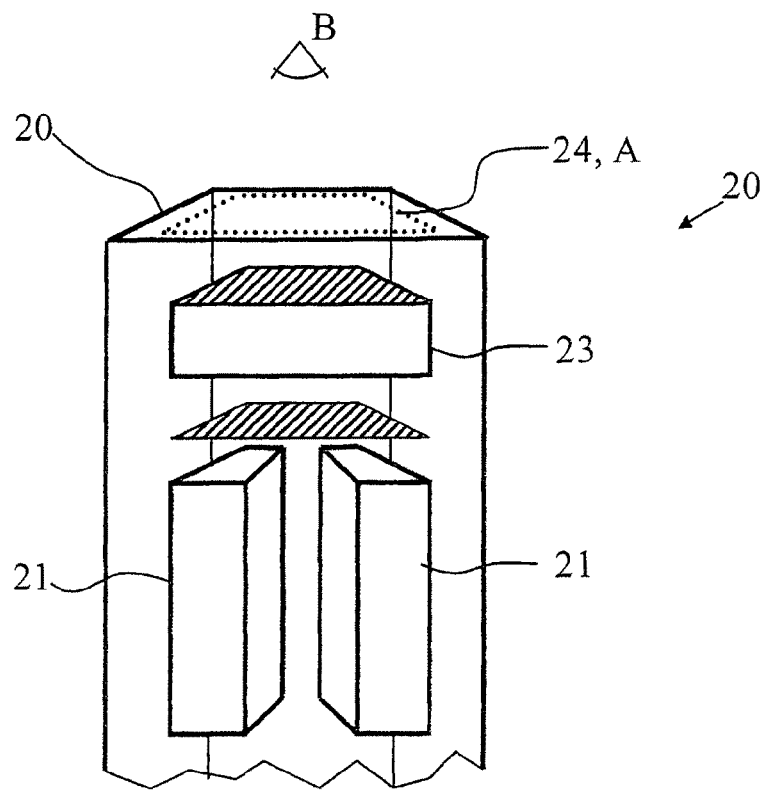
FIG. 10 is an illustration that explains the cross section surface area relationships in an embodiment of the apparatus claimed by the invention in which the sub-pixel image aperture 24 with the image compartment 23, viewed from the direction of an observer B, covers the image compartments 21 lying underneath it.

FIG. 10 illustrates the cross sectional area ratios in one embodiment of the apparatus claimed by the invention as described in Claim 19. For purposes of illustration, this figure is shown in perspective and is essentially the same as the embodiment illustrated in FIG. 8. Accordingly, the subpixel image aperture 24 with the image compartment 23 is located, seen from the direction of an observer B, so that the image compartments 21 underneath, of which only two are shown, are covered. The invention teaches that the subpixel image area A visible from the direction of an observer B is essentially equal to the total cross section area of the image compartment 23 and/or of the double strand visible from the same direction. The essentially equivalent surfaces are highlighted in FIG. 10 by cross-hatching or the dotted line of the subpixel image aperture 24. Because of the size and positioning of the image compartment 23 and of the other compartments 21 shown in FIG. 10, the pixel image surface A perceived by an observer B can be as large as possible in relation to the outside dimensions of the subpixel 20. Two additional subpixels can also be located very close to the illustrated subpixel 20, which results in pixels with a correspondingly high subpixel image density. Pixels of this type can also be used to manufacture a display with optimized pixel image density, which has the highest possible ratio of pixel image surface to the rest of the surface.

Figure 11:
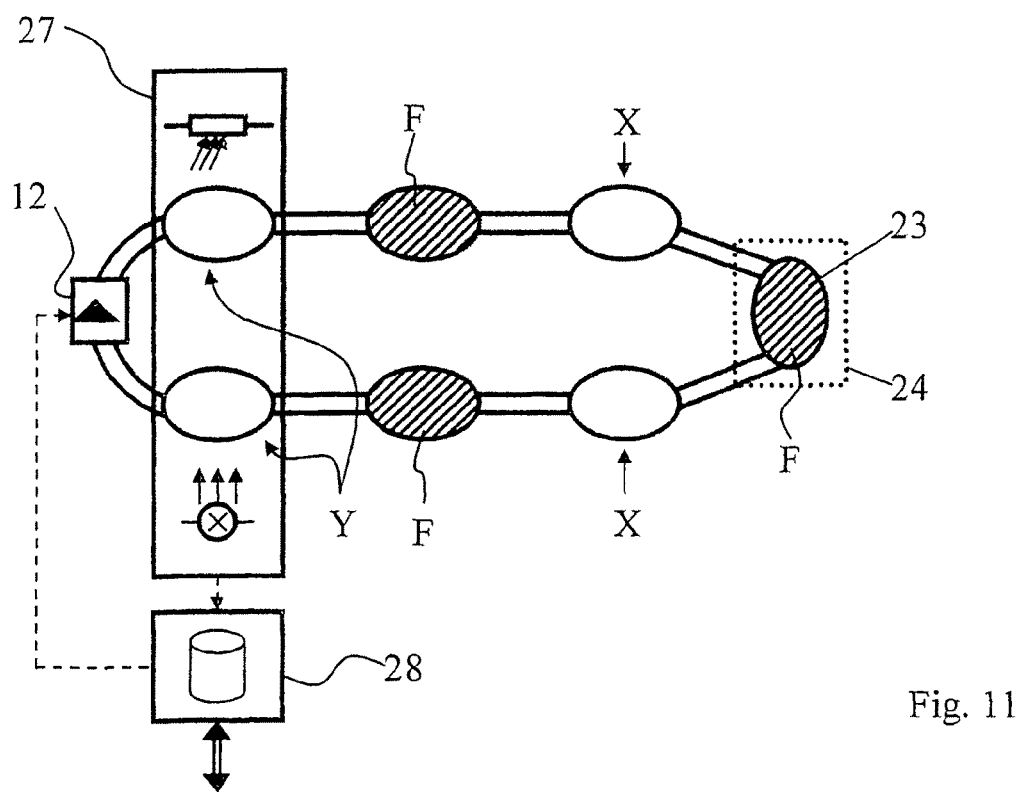
FIG. 11 illustrates one embodiment of essential parts of a sub-pixel 20 of the apparatus claimed by the invention which comprises, among other things, means for detection 27 and means for storage and retrieval 28.

FIG. 11 shows one embodiment of essential parts of a subpixel 20 of the apparatus claimed by the invention, which comprises, among other things, means for detection 27 and means for storage and retrieval 28. Some of the compartments of the subpixel are filled with colored fluid F, and some are shown empty, as a result of which a corresponding space with the first perimeter X results. In the form illustrated here, this space is exactly one compartment wide. Only at one point are two empty compartments shown one behind the other; consequently, there is a second-perimeter space Y which is exactly two compartments wide. The invention teaches that this second-perimeter space Y may occur only one single time in the fluidic chain, because its particular width can be detected by a means for detection 27. In the illustrated embodiment, these means for detection comprise a light source (light bulb symbol) and a photosensitive resistance (LRD graphical symbol for switching devices). Only in the presence of a second-perimeter space Y can the light from the light source reach the photosensitive resistance and thus indicate the existence of the second-perimeter space Y. As a result of the detection of the second-perimeter space Y, the position of the individual colored fluids F in the compartments of the fluidic chain is known. Accordingly, the detection of the second-perimeter space Y can cause an initialization of the apparatus claimed by the invention. An initialization of this type can be necessary, for example, before the initial startup or in the event of a loss of information on the current position of the individual colored fluids F inside the fluidic chain.

FIG. 11 also shows means for the storage and retrieval 28 of the position of the second-perimeter space Y. For the case (not illustrated) in which the apparatus alternatively or additionally comprises means for the detection of the position of at least one of the colored fluids F, the means for storage and retrieval 28 can be used analogously. The drawing also shows corresponding data transmission lines which are symbolized by the thin broken lines with an arrow. Accordingly, the means for storage and retrieval 28 can actuate the means for the transport 12 of the colored fluids F, and therefore causes the continued transport of the colored fluids F in the fluidic chain until it receives a signal from the means for detection 27 which indicates to it the detection of the second-perimeter space Y. The means for storage and retrieval 28 can also be used to store the position of the second-perimeter space Y and/or the position of at least one of the colored fluids F and optionally to transmit it to a communications unit (not shown). Likewise, the means for storage and retrieval 28 can also receive signals from a communications unit (not shown) and convert them into actuation pulses for the means for transport 12 of the colored fluids F. The double arrow that is next to the means for storage and retrieval 28 symbolizes the bidirectional exchange of information.

Figure 12:
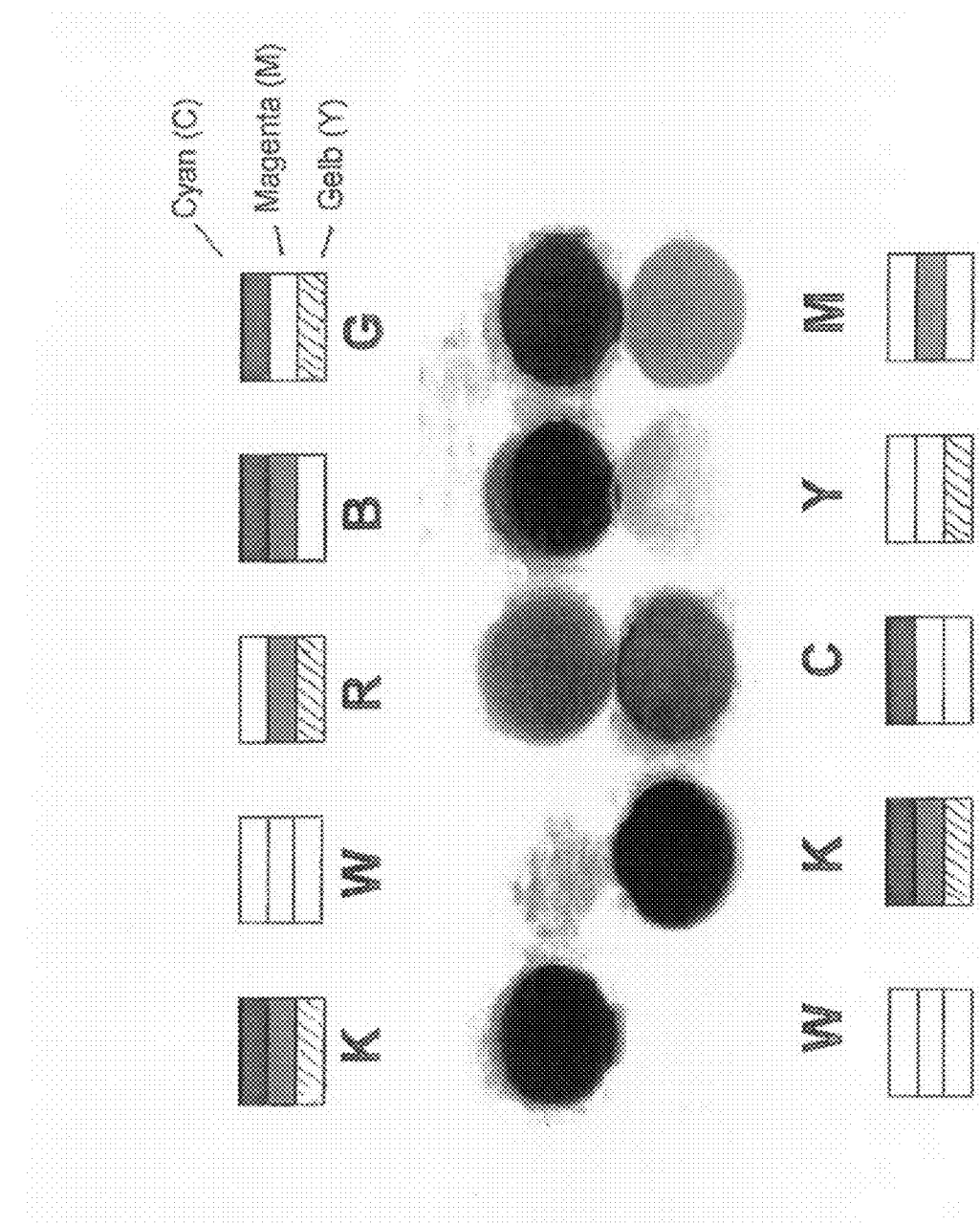
FIG. 12 shows how the colors red, blue, green, cyan, yellow, magenta and black and white can be formed by means of sub-pixels lying one on top of another.

FIG. 12 shows how the colors red, blue, green, cyan, yellow, magenta, white and black can be formed by means of a stack of three subpixels lying one on top of another, in which each of the colors cyan, magenta or yellow is called into the pixel image aperture. In each stack, the uppermost subpixel in the illustration is provided for cyan, the middle for magenta, the bottom for yellow. For reasons of clarity of the illustration, when "yellow" is called into the pixel aperture, it is shown with cross hatching. Thus white (W) can be displayed by not calling up any of the colors cyan, magenta or yellow into the pixel image aperture, black (K) by calling up all of the colors into the pixel image aperture, cyan (C), yellow (Y), magenta (M) by calling up the appropriate color into the image aperture, red (R) by calling up magenta and yellow into the pixel image aperture, blue (B) by calling up magenta into the pixel image aperture, and green (G) by calling up cyan and yellow into the pixel image aperture.

FIG. 13 shows in table form the number of colors and the equivalent bits that can be displayed with the colors generated as illustrated in FIG. 12. It is apparent that depending on the number of subpixels or stacks per pixel, numbers of colors are possible that make possible a high degree of color fidelity in the display of the color space.

Figure 14:
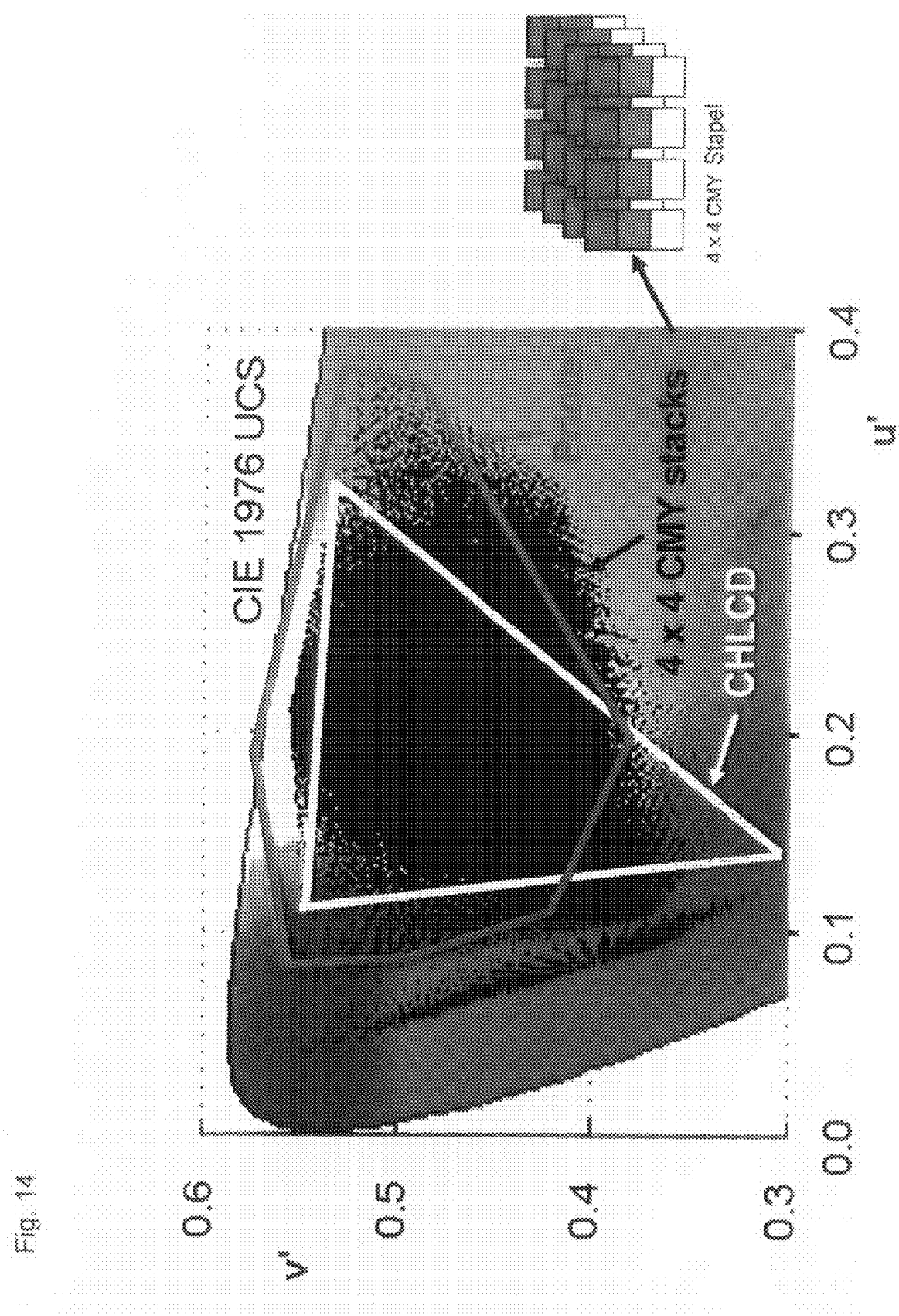
FIG. 14 shows, in solid black, the color space which can be displayed with a 4×4 pixel, in comparison with the color space of a printer (grey border) and a cholesteric liquid crystal display (white border).

The result is illustrated in FIG. 14. The color space that can be achieved with one pixel consisting of 4×4 pixels or stacks is shown in black, as described in connection with FIG. 12. It is apparent that the color space corresponds very well to the one that can be achieved with a printer (grey border). For purposes of comparison, the white border shows how the color space of a cholesteric liquid crystal display lies by comparison.

With the invention, images can therefore be presented on a display with a high degree of color fidelity.

LIST OF REFERENCE NUMBERS AND ABBREVIATIONS

A Subpixel image surface
B Observer
$B_D$ Width of the double strand
F Colored fluid or color
L Length
$L_B$ Length of the image compartment/Subpixel image aperture
Q Cross section
X First-perimeter space
Y Second-perimeter space
10 Pixel
11 Pixel image aperture
12 Means for transport
13 Means for selection
20 Subpixel
20' Additional subpixel
21 Compartment
21' Neighboring compartment
22 Channel
22' Side, side wall
22" Connecting channel segment
23 Image compartment
24 Subpixel image aperture
25 Tapered section, periodic taper
26 Cover
27 Means for detection
28 Means for storage and retrieval

The invention claimed is:

1. Apparatus for the display of color information (color display) using at least one individual pixel (1), the color of which is variable, in which
   (a) the at least one pixel (10) consists of at least one subpixel (20), whereby the subpixel (20) comprises a fluidic chain in the form (i) of a plurality of compartments (21) for the separate storage of certain, specified colors (F) present in fluid form, between which (ii) these colored fluids (F) can be transported in channels (22), and in which (iii) the fluidic chain further comprises an image compartment (23) with an aperture (subpixel image aperture (24), through which exclusively the respective contents of the image compartment (23) is visible to an observer (B),
   (b) the at least one pixel (10) comprises a pixel image aperture (11), through which essentially only the respective subpixel image aperture or apertures (24) is/are visible, and
whereby the apparatus also comprises means for the transport (12) of the colored fluids (F);
wherein one of the colors (F) red, green, blue or cyan, magenta, yellow, white and black is contained in each of the compartments (21) of the at least one subpixel (20).

2. Apparatus as recited in claim 1, in which the means for the transport (12) of the colored fluids (F) originate from the group comprising fluid pumps and electrowetting.

3. Apparatus as recited in claim 1, in which at least one of the subpixels (20) comprises its own means for the transport (12) of the colored fluids (F); or at least one of the pixels (10) comprises at least one means for the transport (12) of the colored fluids (F) and one means for the selection of the subpixel (20); or at least one means for the transport (12) of the colored fluids and one means for the selection (13) of the respective pixel (10) and/or subpixel (20).

4. Apparatus as recited in claim 1, wherein the cross section (Q) through each compartment (21) and/or image compartment (23) is elliptical, quasi-elliptical or rounded at least in one cross sectional plane, and the cross section (Q) tapers toward the respective neighboring compartment (21').

5. Apparatus as recited in claim 1, characterized in that the individual compartments (21) or the image compartment (23) are formed by the fact that a channel (22) with essentially flat side walls (22') has, on at least two opposite sides (22'), periodic tapers (25) which narrow the channel (22) by at least 5% and by a maximum of 30%, and the length (L) of which is either not longer than 100 μm or at least 20% of the length of the compartment.

6. Apparatus as recited in claim 1, in which the subpixel image aperture (24) of each pixel (10) is sized and located so that they lie one above the other and inside the pixel image aperture (11).

7. Apparatus as recited in claim 6, in which the subpixel image aperture (24) is formed by the fact that on the side facing the observer (B) at least one additional subpixel (20') or a cover (26) covers all the areas that lie outside the subpixel image aperture (24).

8. Apparatus as recited in claim 7, in which at least two pixels (10) are located next to each other so that only the respective pixel image aperture (11) is visible by an observer (B).

9. Apparatus as recited in claim 1, in which the subpixel image apertures (21) of each pixel (10) is sized and located so that they lie directly next to each other and inside the pixel image aperture (11).

10. Apparatus as recited in claim 1, characterized in that essential parts of the fluidic chain are located in a double strand or in the form of a closed fluidic circuit.

11. Apparatus as recited in claim 10, in which the subpixel image aperture (24) or the image compartment (23) is located so that the other compartments (21) of the subpixel (20), seen from the direction of an observer (B), are located underneath the subpixel image aperture (24) located at one end of the double strand, so that they are covered by it.

12. Apparatus as recited in claim 1, wherein the individual colored fluids (F) in the compartments (21) and the image compartment (23) are arranged so that between the compartments (21), (23) that contain colored fluids (F), there is at least one space with a first perimeter (X) with a certain number of compartments (21), (23) that do not contain colored fluid (F), and that there is also exactly one space with a second perimeter (Y) which comprises a different number of compartments (21), (23) that do not contain colored fluid (F), the number of which is different from the number of spaces with the first perimeter (X), and that there are also means for the detection (27) of this space with a second perimeter (Y).

13. Apparatus as recited in claim 12, wherein the means for the detection (27) of the space with the second perimeter (Y) comprises effects from the group comprising capacitive, inductive, optical and/or resistive effects.

14. Apparatus as recited in claim 12, in which the number of the compartments (21) including the image compartment (23) equals exactly twice the number of colored fluids (F) plus 1.

15. Apparatus as recited in claim 1, wherein each pixel and/or each subpixel comprises at least one identifier to make possible its unambiguous identification, as well as a communications unit for unidirectional or bidirectional communication with an actuator unit for the preparation of the image to be displayed and for transmission to the pixels (10) and/or subpixels (20).

16. Apparatus as recited in claim 1, wherein the fluidic and/or the electronic components of the pixels are made essentially of plastic and can be manufactured by means of mass production methods.

17. Apparatus as recited in claim 1, wherein the subpixels 920) and the pixels (10) are made of a flexible material.

18. Method for the display of color information (color display) using
at least one individual pixel (10), the color of which can be varied, whereby the pixel (10) consists of at least one subpixel (20), and whereby the subpixel (20) comprises a fluidic chain in the form of a plurality of compartments (21) for the separate storage of certain defined colors (F) that are present in the form of colored fluids, between which compartments these colored fluids (F) can be transported in channels (22), (22"), and whereby the fluidic chain of the respective subpixel (20) also comprises a fluid compartment (23) with an aperture (subpixel image aperture) (24), through which exclusively the current contents of the image compartment (23) are visible to an observer (B);
at least one pixel image aperture (11), through which essentially only the respective subpixel image aperture or apertures (24) is/are visible;
at least one means for the transport (12) of the colored fluids (F);
comprising the following steps:
Determination of the position of at least one of the colored fluids (F) in each subpixel (20);
Transport of the desired colored fluid (F) into the sub-pixel image aperture (24) by means for the transport (12) of the colored fluids (F).

19. Method as recited in claim 18, using at least two sub-pixels (20), and also comprising the steps:
Determination of that combination of the colored fluids (F) of all the subpixels (20) that comes as close as possible to a desired color impression;
Transport of the desired colored fluids (F) into the respective subpixel image apertures (24).

20. Method as recited in claim 18, whereby the apparatus for the determination of the position of at least one of the colored fluids (F) also comprises means for the detection (27) of a space with the second perimeter (Y), and whereby for the determination of the position of at least one of the colored fluids (F), the following processes are carried out simultaneously:
Transport of the colored fluids (F);
Operation of the means for the detection (27) of a space with the second perimeter (Y);
until the means for detection (27) has detected a space with the second perimeter (Y).

21. Method as recited in claim 18, whereby the apparatus for the determination of the position of at lest one of the colored fluids (F) alternatively or in addition to the means for the detection (27) of a space with a second perimeter (Y) comprises means for the detection (27) of at least one of the colored fluids (F), and whereby for the determination of the position of at least one of the colored fluids (F), the following processes are carried out simultaneously:
Transport of the colored fluids (F);
Operation of the means for the detection (25) of at least one of the colored fluids (F);
until the means for the detection (27) of at least one of the colored fluids (F) has detected a determined colored fluid (F).

22. Method as recited in claim 18, whereby
the determination of the space with the second perimeter (Y) and/or of the position of at least one of the colored fluids (F) is performed so that prior to the first operation of each subpixel; (20), a one-time initialization of the subpixel takes place, and that
during operation, when a change in the position of the space with a second perimeter (Y) and/or the position of at least one of the colored fluids (F) is necessary, the respective resulting new position is stored, so that
the respective position can be retrieved before repeated operation.

\* \* \* \* \*